(12) United States Patent
Hackett et al.

(10) Patent No.: US 11,133,114 B2
(45) Date of Patent: *Sep. 28, 2021

(54) STEEL-VANADIUM ALLOY CLADDING FOR FUEL ELEMENT

(71) Applicant: TerraPower LLC, Bellevue, WA (US)

(72) Inventors: Micah J. Hackett, San Francisco, CA (US); Greg A. Vetterick, Seattle, WA (US); Cheng Xu, Kirland, WA (US)

(73) Assignee: TerraPower LLC, Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/865,854

(22) Filed: May 4, 2020

(65) Prior Publication Data

US 2020/0365284 A1 Nov. 19, 2020

Related U.S. Application Data

(63) Continuation-in-part of application No. 16/295,686, filed on Mar. 7, 2019, now abandoned, which is a
(Continued)

(51) Int. Cl.
*G21C 3/07* (2006.01)
*C22C 38/32* (2006.01)
(Continued)

(52) U.S. Cl.
CPC ............. *G21C 3/07* (2013.01); *B23K 20/021* (2013.01); *B32B 1/02* (2013.01); *B32B 15/015* (2013.01);
(Continued)

(58) Field of Classification Search
CPC .......... G21C 3/07; B32K 20/021; B32B 1/02; B32B 15/015; C22C 27/025; B21B 21/00; B21C 23/22

See application file for complete search history.

(56) References Cited

U.S. PATENT DOCUMENTS 3,212,988 A 10/1965 Ringot
3,475,340 A 10/1969 Pollock
(Continued)

FOREIGN PATENT DOCUMENTS

GB 1396455 6/1975
GB 1396455 A * 6/1975 ............... C25D 9/08
(Continued)

OTHER PUBLICATIONS

Borisova et al, "Vanadium Carbide Coatings: Deposition Process and Properties", Plansee Holding AG, Jan. 1, 2001, 17 pages (Year: 2001).*

(Continued)

*Primary Examiner* — David E Smith

(57) ABSTRACT

This disclosure describes various configurations and components for bimetallic and trimetallic claddings for use as a wall element separating nuclear material from an external environment. The cladding materials are suitable for use as cladding for nuclear fuel elements, particularly for fuel elements that will be exposed to sodium or other coolants or environments with a propensity to react with the nuclear fuel.

17 Claims, 15 Drawing Sheets

Related U.S. Application Data continuation of application No. 15/651,884, filed on Jul. 17, 2017, now Pat. No. 10,311,981, which is a continuation-in-part of application No. 15/623,119, filed on Jun. 14, 2017, now Pat. No. 10,109,382.

(60) Provisional application No. 62/458,377, filed on Feb. 13, 2017.

(51) Int. Cl.

| | | |
|---|---|---|
| C22C 38/28 | (2006.01) | |
| C22C 38/26 | (2006.01) | |
| C22C 38/24 | (2006.01) | |
| C22C 38/22 | (2006.01) | |
| C22C 38/02 | (2006.01) | |
| C22C 38/00 | (2006.01) | |
| B32B 1/02 | (2006.01) | |
| B32B 15/01 | (2006.01) | |
| B23K 20/02 | (2006.01) | |
| C23C 30/00 | (2006.01) | |
| C23C 24/10 | (2006.01) | |
| C23C 28/02 | (2006.01) | |
| C22C 27/02 | (2006.01) | |
| B21B 21/00 | (2006.01) | |
| B21C 23/22 | (2006.01) | |
| B23K 103/18 | (2006.01) | |

(52) U.S. Cl.
CPC .......... *C22C 27/025* (2013.01); *C22C 38/001* (2013.01); *C22C 38/02* (2013.01); *C22C 38/22* (2013.01); *C22C 38/24* (2013.01); *C22C 38/26* (2013.01); *C22C 38/28* (2013.01); *C22C 38/32* (2013.01); *C23C 24/106* (2013.01); *C23C 28/021* (2013.01); *C23C 28/023* (2013.01); *C23C 28/027* (2013.01); *C23C 30/005* (2013.01); *B21B 21/00* (2013.01); *B21C 23/22* (2013.01); *B23K 2103/18* (2018.08); *Y02E 30/30* (2013.01)

(56) References Cited

U.S. PATENT DOCUMENTS

| | | | | |
|---|---|---|---|---|
| 3,597,193 | A * | 8/1971 | Pollack | C22C 27/025 |
| | | | | 420/424 |
| 3,850,584 | A * | 11/1974 | Bohm | G21C 3/07 |
| | | | | 428/656 |
| 3,925,151 | A | 12/1975 | Klepfer | |
| 4,029,545 | A | 6/1977 | Gordon | |
| 4,032,400 | A | 6/1977 | Johnson et al. | |
| 4,045,288 | A | 8/1977 | Armijo | |
| 4,242,130 | A * | 12/1980 | Brandis | C22C 38/32 |
| | | | | 420/10 |
| 4,390,497 | A * | 6/1983 | Rosenbaum | G21C 3/20 |
| | | | | 376/414 |
| 4,894,203 | A | 1/1990 | Adamson | |
| 4,977,034 | A | 12/1990 | Wang | |
| 5,247,550 | A | 8/1993 | Perkins et al. | |
| 5,301,218 | A | 4/1994 | Taylor et al. | |
| 5,524,032 | A | 6/1996 | Adamson | |
| 10,109,382 | B2 * | 10/2018 | Hackett | C22C 38/002 |
| 10,311,981 | B2 * | 6/2019 | Hackett | C22C 27/025 |
| 2008/0240334 | A1 | 10/2008 | Senor | |
| 2011/0171463 | A1 * | 7/2011 | Hohle | F03D 1/00 |
| | | | | 428/336 |
| 2013/0170603 | A1 | 7/2013 | Baek | |
| 2014/0185733 | A1 * | 7/2014 | Povirk | G21C 3/18 |
| | | | | 376/417 |
| 2015/0050521 | A1 | 2/2015 | Le Flem | |
| 2019/0066857 | A1 | 2/2019 | Hackett | |
| 2020/0027581 | A1 | 1/2020 | Hackett | |

FOREIGN PATENT DOCUMENTS

| | | |
|---|---|---|
| KR | 101483873 | 1/2015 |
| KR | 101483873 B1 * | 1/2015 |

OTHER PUBLICATIONS

Shantong et al., "Mechanical Properties of Vanadium Carbide Layer on Steel Surface", International Conference on Mining, Mineral Processing and Metallurgical Engineering, Apr. 15-16, 2013, p. 141-144 (Year: 2013).*

Cohen et al., ANL/ET/CP80384, "Vanadium Line HT9 Cladding Tubes", 1994, 12 pgs. (Year: 1994).*

Borisova et al., "Vanadium Carbide Coatings: Deposition Process and Properties", Plansee Holding AG, Jan. 1, 2001, 17 pages.

Bragg-Sitton, Shannon, Development of advanced accident-tolerant fuels for commercial LWRs, Nuclear News, Mar. 2014, pp. 83-91.

Chung et al., "Properties of V—4Cr—4Ti for Application as Fusion Reactor Structural Components", Third International Symposium on Fusion Nuclear Technology, 1994.

Cohen, et al., ANL/ET/CP80384, Vanadium Line HT9 Cladding Tubes, 1994, 12 pages.

Edison et al., "Vanadium Alloys vs Stainless Steel for Sodium-Cooled Fast Reactor Cladding", Nuclear Applications & Technology vol. 7, Nov. 1969, pp. 443-455.

Heo, ("Recrystallization and Precipitation Behavior of Low-Activation V—Cr—Ti Alloys After Cold Rolling", Journal of Nuclear Materials, vol. 325, Issue 1, 2004, p. 53-60.

Kim, et al., Performance of a diffusion barrier under a fuel-clad chemical interaction (FCCI), J. Nucl. Materials, 394 (2009) 144-150.

Klepikov, "Hydrogen Release from Irradiated Vanadium Alloy V—4Cr—4Ti", Fusion Engineering and Design, vol. 51-52, 2000, p. 127-133.

PCT International Preliminary Report on Patentability in International Application PCT/US2017/037512, dated Aug. 13, 2019, 18 pages.

PCT International Search Report and Written Opinion in International Application PCT/US2017/037512, dated Mar. 1, 2018, 25 pages.

Shantong et al, "Mechanical Properties of Vanadium Carbide Layer on Steel Surface", International Conference on Mining, Mineral Processing and Metallerugical Engineering, Apr. 15-16, 2013, pp. 141-144.

Starlite, Appendix to "The Starlite Study: Assessment of Options for Tokamak Power Plants", 1997, http://aries.ucsd.edu/LI 8/RE PORT /ST AR LITE/FI NAL/appendix.pdf, 22 pages.

* cited by examiner

STEEL-VANADIUM ALLOY CLADDING FOR FUEL ELEMENT

CROSS REFERENCE TO RELATED APPLICATIONS

The present application is a continuation-in-part of U.S. Non-provisional patent application Ser. No. 16/295,686 filed Mar. 7, 2019, now abandoned, which is a continuation of U.S. Non-provisional patent application Ser. No. 15/651,884 filed Jul. 17, 2017, now issued U.S. Pat. No. 10,311,981, which is a continuation-in-part application of U.S. Non-provisional patent application Ser. No. 15/623,119 filed Jun. 14, 2017, now issued U.S. Pat. No. 10,109,382, which application claims the benefit of U.S. Provisional Patent Application No. 62/458,377 filed Feb. 13, 2017, which applications are incorporated herein by reference in their entirety. To the extent appropriate, priority is claimed to each of the foregoing applications.

INTRODUCTION

When used in nuclear reactors, nuclear fuel is typically provided with cladding. The cladding may be provided to contain the fuel and/or to prevent the fuel from interacting with an external environment. For example, some nuclear fuels are chemically reactive with coolants or other materials that may otherwise come in contact with the nuclear fuel absent the cladding to act as a separator.

The cladding may or may not be a structural element. For example, in some cases the nuclear fuel is a solid structural element, e.g., a solid rod of uranium metal or uranium dioxide, and the cladding is essentially a coating applied to the surface of the solid fuel. In other cases, nuclear fuel may be in a liquid form, powder form, or aggregate form, e.g., pellets or grains, that may require containment in a structural cladding. In any case, the cladding may take the form of a tube, box, or vessel within which the fuel is placed. The fuel and cladding combinations are often referred to as a "fuel element", "fuel rod", or a "fuel pin".

Fuel clad chemical interaction (FCCI) in metallic fuel systems refers to the degradation of fuel elements due to the chemical reaction between the fuel and clad components. The chemical interaction is due, at least in part, to multi-component interdiffusion of species from the cladding into the fuel and vice versa. Specifically, diffusion couple and irradiation experiments both demonstrate migration of clad components (iron and nickel) into the fuel, while fission products (primarily the lanthanides like cerium, neodymium, and praseodymium) diffuse outward into the clad.

FCCI leads to two primary concerns: reduction of clad mechanical properties from formation of brittle intermetallic compounds and wastage/thinning of the cladding, and formation of relatively low melting compositions within the fuel and clad interface. These concerns ultimately affect performance limits for the fuel system, with the peak inner clad temperature (PICT) being influenced by the low melting point (725° C.) of the uranium-iron eutectic that forms at 33 at % Fe. Additionally, the few occurrences of cladding breaches in the fueled region of rods irradiated in EBR-II exhibited extensive FCCI adjacent to the breach locations (max penetrations up to 170 μm into the clad), implicating FCCI as a primary contributor to these breaches.

Although sodium-bonded metal fuel pins have been irradiated to peak burnups up to 20 at % with manageable amounts of FCCI, these irradiations typically were performed over the course of two to four years. Beyond the higher peak burnups (30 at %) required for a traveling wave reactor (TWR) application, the extended service time at temperature greatly compounds the concerns of degradation due to FCCI.

BRIEF DESCRIPTION OF THE DRAWINGS

The following drawing figures, which form a part of this application, are illustrative of described technology and are not meant to limit the scope of the invention as claimed in any manner, which scope shall be based on the claims appended hereto.

DETAILED DESCRIPTION

This disclosure describes various configurations and components for bimetallic and trimetallic claddings for use as a wall element separating nuclear material from an external environment. The cladding materials are suitable for use as cladding for nuclear fuel elements, particularly for fuel elements that will be exposed to sodium or other coolants or environments with a propensity to react with the nuclear fuel.

Two Layer Steel-Vanadium Alloy Claddings

Structural Steel Layer with Carbon-Doped Vanadium Liner

Figure 1:
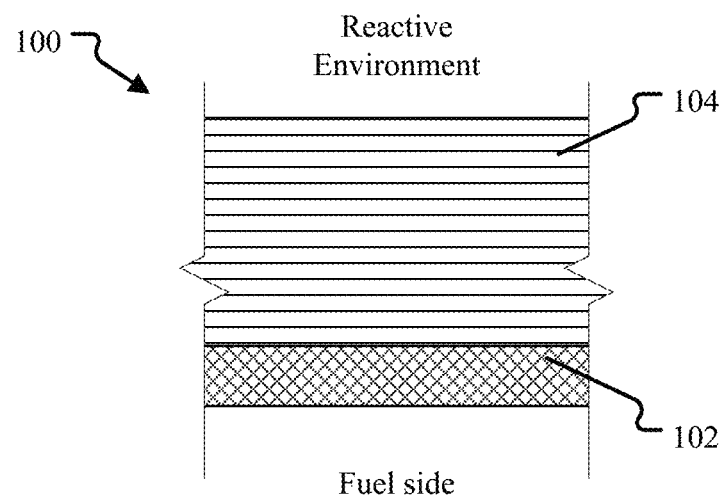
FIG. 1 illustrates a cut away view of a linear section of cladding, or wall element, showing the two-layer construction of a cladding having a structural outer layer.

FIG. 1 illustrates a cut away view of a linear section of cladding, or wall element, showing the two-layer construction of the cladding. The cladding 100 may be part of any structural component that separates nuclear fuel from a reactive, external environment. For example, the cladding 100 may be part of a wall of a tube containing nuclear fuel, a vessel or any other shape of storage container. In an alternative embodiment, rather than being a section of wall of a container, the cladding may be the resulting layers on the surface of a solid nuclear fuel created by some deposition or cladding technique. These techniques, such as electroplating, thermal spray coating, chemical vapor deposition, sputtering, ion implantation, ion plating, sputter deposition, laser surface alloying, hot dipping, and annealing to name but a few, are well known in the art and, depending on the desired end cladding properties, any suitable technique may be used.

Regardless of the manufacturing technology used, the cladding 100 shown in FIG. 1 consists of two layers 102, 104 of material: a first layer 102 and a second, structural, layer 104 that is the structural element of the cladding. The first layer 102 separates the fuel, or the storage area where the fuel will be placed if the fuel has not been provided yet, from the structural layer 104. The first layer 102 acts as a liner that protects the structural layer 104 from contact with the fuel. The second layer 104 is between the first layer 102 and the external environment. Thus, the first layer 102 is a layer of material with one surface exposed to the fuel and the other surface exposed to the second layer 104 while the second layer 104 has a first-layer-facing surface and a surface exposed to the external environment.

The cladding 100 illustrated in FIG. 1 has a first layer 102 of a material selected to reduce the effects of FCCI on both the properties of the first layer 102 and the stored fuel and also selected to reduce the effects of detrimental chemical interactions between the second layer 104 and first layer 102. In an embodiment, the first layer 102 is carbon-doped vanadium and the second layer is a steel. To reduce the interaction between the steel and the carbon-doped vanadium layers, in an embodiment the carbon-doped vanadium is doped with at least 0.001 wt. % (10 ppm) carbon. This will reduce the amount of decarburization observed in the steel and reduce the degradation of the steel while in use as a fuel element.

In an embodiment the carbon-doped vanadium is a vanadium carbon alloy consisting of at least 99.0 wt. % V; 0.001-0.5 wt. % C; with the balance other elements, wherein the carbon-doped vanadium includes not greater than 0.1 wt. % of any one of the other elements, and wherein the total of the other elements does not exceed 0.5 wt. %. In more pure embodiments, the total of the other elements (i.e., the total of the composition that is not V or C) does not exceed 0.05, 0.025, or 0.01 wt. % of the alloy. In one specific embodiment, for example, the carbon range is from 0.1 to 0.3 wt. % C, the total of the other elements (everything that is not V or C) combined is less than 0.5 wt. %, and the balance is V. In another specific embodiment, for example, the carbon range is from 0.1 to 0.3 wt. % C, the total of the other elements (everything that is not V or C) combined is less than 0.1 wt. %, and the balance is V.

The steel layer 104 may be any suitable steel. Examples of suitable steels include a martensitic steel, a ferritic steel, an austenitic steel, a FeCrAl alloy, an oxide-dispersion strengthened steel, T91 steel, T92 steel, HT9 steel, 316 steel, and 304 steel. The steel may have any type of microstructure. For example, in an embodiment substantially all the steel in the layer 104 has at least one phase chosen from a tempered martensite phase, a ferrite phase, and an austenitic phase. In an embodiment, the steel is an HT9 steel or a modified version of HT9 steel.

In one embodiment, the modified HT9 steel is 9.0-12.0 wt. % Cr; 0.001-2.5 wt. % W; 0.001-2.0 wt. % Mo; 0.001-0.5 wt. % Si; up to 0.5 wt. % Ti; up to 0.5 wt. % Zr; up to 0.5 wt. % V; up to 0.5 wt. % Nb; up to 0.3 wt. % Ta; up to 0.1 wt. % N; up to 0.3 wt. % C; and up to 0.01 wt. % B; with the balance being Fe and other elements, wherein the steel includes not greater than 0.15 wt. % of each of these other elements, and wherein the total of these other elements does not exceed 0.35 wt. %. In other embodiments, the steel may have a narrower range of Si from 0.1 to 0.3 wt. %. The steel of the steel layer 104 may include one or more of carbide precipitates of Ti, Zr, V, Nb, Ta or B, nitride precipitates of Ti, Zr, V, Nb, or Ta, and/or carbo-nitride precipitates of Ti, Zr, V, Nb, or Ta.

Figure 2:
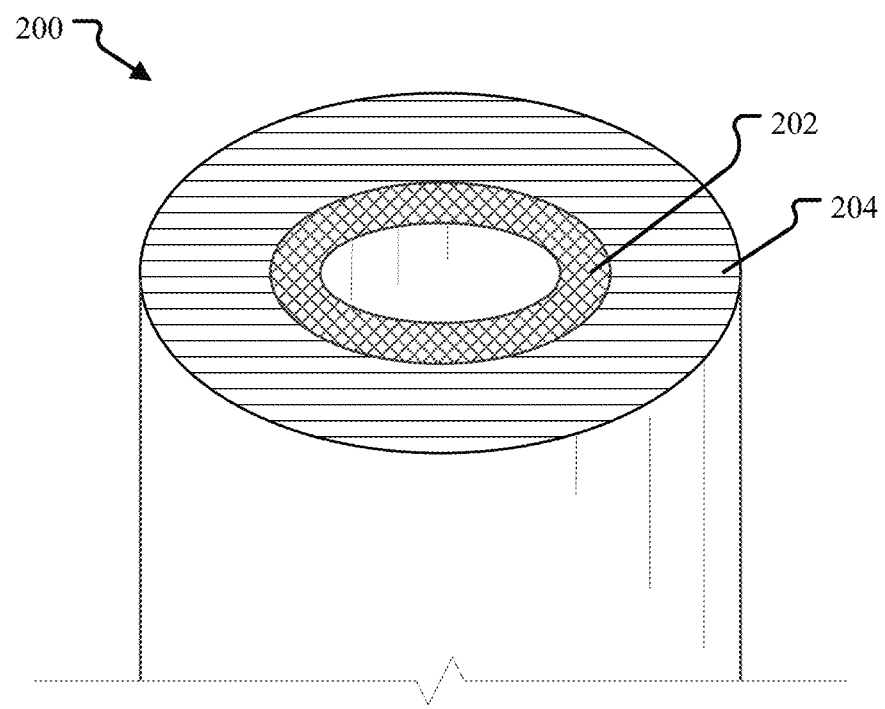
FIG. 2 illustrates a tubular embodiment of the cladding of FIG. 1.

FIG. 2 illustrates a tubular embodiment of the cladding of FIG. 1. In the embodiment shown, the wall element 200 is in the form of a tube with an interior surface and an exterior surface, the first layer 202 of carbon-doped vanadium forming the interior surface of the tube and the second layer 204 of steel forming the exterior surface of the tube. The fuel storage region is in the center of the tube. Fuel within the tube is thus protected from the reactive external environment at the same time the steel layer 104 is separated from the fuel.

The general term wall element is used herein to acknowledge that a tube, vessel or other shape of container may have multiple different walls or sections of a wall of the cladding 100 as illustrated in FIG. 1. That is, the container has a shape that is defined by one or more continuously connected wall elements to form a vessel. However, embodiments of claddings include those that have one or more wall elements that are constructed of materials that are not the cladding 100 as illustrated in FIG. 1 as well as wall elements of the cladding 100. For example, a tube may have a cylindrical wall element of the cladding 100 described in FIG. 1 and FIG. 2 but have end walls of a different construction. Likewise, a cube-shaped fuel container may have sidewalls and a bottom wall constructed as shown in FIG. 1, but a top of different construction.

Figure 3:
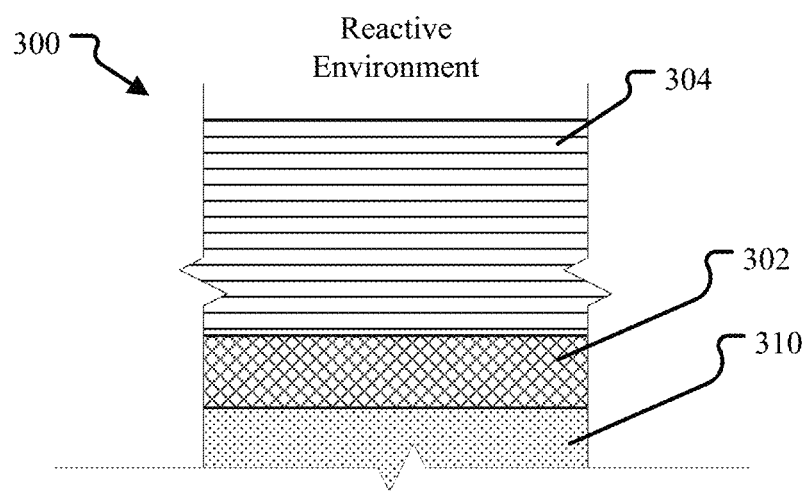
FIG. 3 illustrates the wall element of FIG. 1 in contact with nuclear material.

FIG. 3 illustrates the wall element of FIG. 1, but this time with nuclear material 310, including but not limited to nuclear fuel, in contact with the carbon-doped vanadium layer 302. The steel layer 304 may be any thickness (i.e., the shortest distance between the exterior surface of the steel layer 304 that is exposed to the reactive environment and the vanadium layer 302) as necessary to provide the strength properties desired for the cladding. The carbon-doped vanadium layer 302 may have a thickness from that of a thin coating (0.1% of the thickness of the structural layer 304) up to 50% of the thickness of the structural layer 304. For example, embodiments of the carbon-doped vanadium layer have a thickness, as a percentage of the steel layer's thickness, of between any of 0.1%, 0.5%, 1.0%, 2.5%, 5%, 10%, 15%, 20% and 25% on the low end up to 5%, 10%, 15%, 20%, 25%, 30%, 35%, 40%, 45% and 50% on the high end.

Embodiments of the wall elements include the ranges that are any combination of the upper and lower limits provided above. For example, the above specifically includes embodiments of carbon-doped vanadium layers having ranges from 1-5%, from 0.1-10%, from 20-45%, and from 0.1-50% of the thickness of the steel layer. However, regardless of the thickness of the carbon-doped vanadium layer the primary structural element of the wall element 300 is the steel layer 304.

Figure 4:
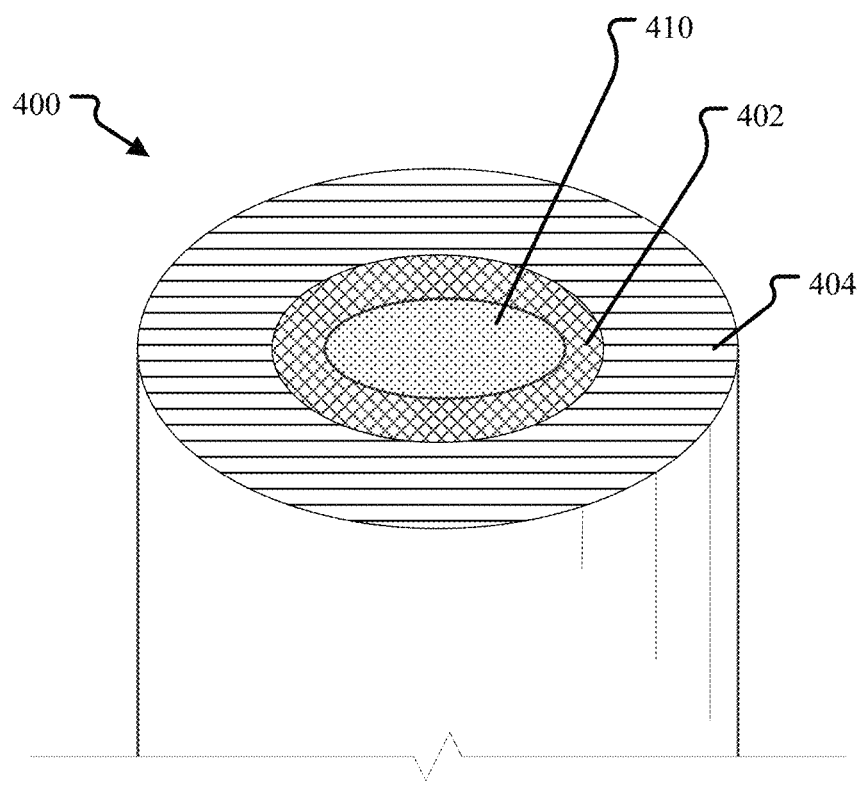
FIG. 4 illustrates a tubular embodiment of the cladding of FIG. 2 with nuclear material contained within the tubular cladding.

FIG. 4, likewise, illustrates a tubular embodiment of the cladding of FIG. 2, but this time with nuclear material 410, including but not limited to nuclear fuel, in the hollow center of the tube 400. The steel layer 404, again, may be any thickness as necessary to provide the strength properties desired for the cladding. The carbon-doped vanadium layer 402 may have a thickness from that of a thin coating (0.1% of the thickness of the structural layer 404) up to 50% of the thickness of the structural layer 404. However, regardless of the thickness of the carbon-doped vanadium layer the primary structural element of the wall element 400 is the steel layer 404.

In an alternative embodiment, the claddings shown in FIGS. 1-4 may be provided with a third, intermediate layer between the steel structural layer and the carbon-doped vanadium layer to further reduce interaction between the steel and the carbon-doped vanadium. Embodiments of suitable intermediate layers are described below with reference to FIGS. 9-12.

For the purposes of this application, nuclear material includes any material containing an actinide, regardless of whether it can be used as a nuclear fuel. Thus, any nuclear fuel is a nuclear material but, more broadly, any materials containing a trace amount or more of U, Th, Am, Np, and/or Pu are nuclear materials. Other examples of nuclear materials include spent fuel, depleted uranium, yellowcake, uranium dioxide, metallic uranium with zirconium and/or plutonium, thorium dioxide, thorianite, uranium chloride salts such as salts containing uranium tetrachloride and/or uranium trichloride.

Nuclear fuel, on the other hand, includes any fissionable material. Fissionable material includes any nuclide capable of undergoing fission when exposed to low-energy thermal neutrons or high-energy neutrons. Furthermore, fissionable material includes any fissile material, any fertile material or combination of fissile and fertile materials. A fissionable material may contain a metal and/or metal alloy. In one embodiment, the fuel may be a metal fuel. It can be appreciated that metal fuel may offer relatively high heavy metal loadings and excellent neutron economy, which is desirable for breed-and-burn process of a nuclear fission reactor. Depending on the application, fuel may include at least one element chosen from U, Th, Am, Np, and Pu. In one embodiment, the fuel may include at least about 90 wt. % U—e.g., at least 95 wt. %, 98 wt. %, 99 wt. %, 99.5 wt. %, 99.9 wt. %, 99.99 wt. %, or higher of U. The fuel may further include a refractory material, which may include at least one element chosen from Nb, Mo, Ta, W, Re, Zr, V, Ti, Cr, Ru, Rh, Os, Ir, and Hf. In one embodiment, the fuel may include additional burnable poisons, such as boron, gadolinium, or indium. In addition, a metal fuel may be alloyed with about 3 wt. % to about 10 wt. % zirconium to dimensionally stabilize the fuel during irradiation and to inhibit low-temperature eutectic and corrosion damage of the cladding.

Examples of reactive environments or materials from which the nuclear material is separated from include reactor coolants such as NaCl—MgCl$_2$, Na, NaK, supercritical CO$_2$, lead, and lead bismuth eutectic.

Structural Vanadium Alloy Layer with Steel Liner

Figure 5:
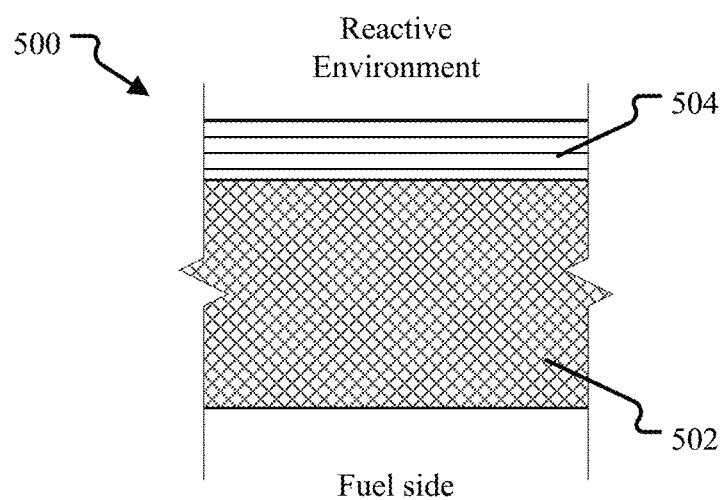
FIG. 5 illustrates a cut away view of a linear section of cladding, or wall element, showing the two-layer construction of a cladding having a structural inner vanadium alloy layer.

FIG. 5 illustrates a cut away view of a linear section of cladding, or wall element, showing the two-layer construction of a cladding having a structural vanadium alloy inner layer. Again, the cladding 500 may be part of any structural component that separates nuclear fuel from a reactive, external environment. For example, the cladding 500 may be part of a wall of a tube containing nuclear fuel, a vessel or any other shape of storage container. In an alternative embodiment, rather than being a section of wall of a container, the cladding may be the resulting layers on the surface of a solid nuclear fuel created by some deposition or cladding technique. These techniques, such as electroplating, thermal spray coating, chemical vapor deposition, sputtering, ion implantation, ion plating, sputter deposition, laser surface alloying, hot dipping, and annealing to name but a few, are well known in the art and depending on the desired end cladding properties any suitable technique may be used.

Regardless of the manufacturing technology used, the cladding 500 shown in FIG. 5 consists of two layers 502, 504 of material. The first layer 502 is the primary structural element of the cladding and separates the fuel, or the storage area where the fuel will be placed if the fuel has not been provided yet, from the second layer 504. The second layer 504 is between the first layer 502 and the external environment. Thus, the first layer 502 is a layer of material with one surface exposed to the fuel and the other surface exposed to the second layer 504 while the second layer 504 has a first-layer-facing surface and a surface exposed to the external environment.

Similar to the cladding described above with reference to FIGS. 1-4, the cladding 500 illustrated in FIG. 5 has a first layer 502 of a material selected to reduce the effects of FCCI on both the structural properties of the first layer 502 and the stored fuel and also selected to reduce the effects of detrimental chemical interactions between the second layer 504 and first layer 502.

In an embodiment, the first layer 502 is a vanadium alloy containing at least 90% V and the second layer 504 is a steel. Vanadium alloys that may be used in the first layer 502 include without limitation vanadium carbon alloys, V-20Ti, V-10Cr-5Ti, V-15Cr-5Ti, V-4Cr-4Ti, V-4Cr-4Ti NIFS Heats 1 & 2, V-4Cr-4Ti US Heats 832665 & 8923864, and V-4Cr-4Ti Heat CEA-J57. In an embodiment, the vanadium alloy consists of 3.0-5.0 wt. % Cr; 3.0-5.0 wt. % Ti; and no more than 0.02 wt. % C; with the balance being V and other elements, wherein the vanadium alloy includes not greater than 0.1 wt. % of each of these other elements, and wherein the total of these other elements does not exceed 0.5 wt. %. This purity requirement may require special refining of the V and Ti, such as double- or triple-melting of the Ti or electro-refining of the V. In more pure embodiments, the total of these other elements does not exceed 0.4, 0.25, or even 0.1 wt. % of the alloy. The carbon range, depending on the embodiment, may be from 0.0001 to 0.02 wt. % C. The vanadium alloy may include one or more carbide precipitates of Cr, Ti and/or other elements.

One particular V-4Cr-4Ti embodiment is provided in TABLE 1, below.

TABLE 1

| Element | Wt. Fraction |
|---------|--------------|
| V       | Bal.         |
| Cr      | 3.5-4.5      |
| Ti      | 3.5-4.5      |
| Si      | 400-1000 ppm |
| O       | <200 ppm     |
| N       | <200 ppm     |

TABLE 1-continued

| Element | Wt. Fraction |
|---|---|
| C | <200 ppm |
| Al | <200 ppm |
| Fe | <200 ppm |
| Cu | <10 ppm |
| Mo | <10 ppm |
| Nb | <10 ppm |
| P | <10 ppm |
| S | <10 ppm |
| Cl | <2 ppm |
| Total of all other elements | <100 ppm and not greater than 0.001 wt. % of any one of the other elements. |

For the embodiment shown in TABLE 1, one suitable manufacturing process is as follows. The source of raw materials may be iodide or electro-refined vanadium with low impurity content and, in an embodiment, the calcium-reduction process is not used to obtain the vanadium. In an embodiment, the titanium source does not include sponge titanium in order to reduce Cl, K, and Na impurities and double- or triple-melting of the titanium feedstock is to be performed to achieve the necessary purity level. The V-4Cr-4Ti may be melted using an appropriate method such as laser beam melting, vacuum arc melting, or cold cathode induction melting, in order to prevent contamination. The ingot is then homogenized to reduce local inhomogeneity of Cr and Ti to <+/−0.3 wt. %. The subsequent ingot is then encapsulated in stainless steel and extruded or hot worked at a temperature from 1100-1300° C. and subsequently warm-rolled at a temperature from 300-900° C. to the final billet size required for bimetallic cladding tube fabrication. One or more intermediate anneals during hot work may be performed at 800-1200° C. for up to three hours in a vacuum furnace. One or more similar anneals may be performed as part of any cold work processing. The anneals during cold work may involve a sequence of anneals from 900-1000° C. (e.g., at 950±10° C.) to soften the vanadium followed by one or more anneals from 700-780° C. to transform the HT9 from martensite to ferrite. Final heat treatment of the bimetallic cladding tube product is performed at 1075±10° C. for 20 minutes with an air cool to room temperature followed by 650-700° C. for 1-3 hours and a rapid cooling rate.

The steel layer 504 may be any suitable steel as described above with reference to FIGS. 1-4. For example, in one embodiment the steel is the modified HT9 steel having 9.0-12.0 wt. % Cr; 0.001-2.5 wt. % W; 0.001-2.0 wt. % Mo; 0.001-0.5 wt. % Si; up to 0.5 wt. % Ti; up to 0.5 wt. % Zr; up to 0.5 wt. % V; up to 0.5 wt. % Nb; up to 0.3 wt. % Ta; up to 0.1 wt. % N; up to 0.3 wt. % C; and up to 0.01 wt. % B; with the balance being Fe and other elements, wherein the steel includes not greater than 0.15 wt. % of each of these other elements, and wherein the total of these other elements does not exceed 0.35 wt. %. In other embodiments, the steel may have a narrower range of Si from 0.1 to 0.3 wt. %. The steel of the steel layer 104 may include one or more of carbide precipitates of Ti, Zr, V, Nb, Ta or B, nitride precipitates of Ti, Zr, V, Nb, or Ta, and/or carbo-nitride precipitates of Ti, Zr, V, Nb, or Ta.

As mentioned above, the vanadium alloy layer 502 is the primary structural element of the cladding. That is, the vanadium alloy layer 502 is the layer that provides most of the solid structure maintaining the shape of the fuel element and preventing failure of the cladding and release of nuclear material. The steel layer 504 may be nothing more than a coating of steel on the external surface of the vanadium alloy layer 502. In these embodiments, the vanadium alloy layer is at least twice as thick as the steel layer 504. That is, the steel layer 504 may be as little as 0.001% the thickness of the vanadium alloy layer 502 and up to 50% the thickness of the vanadium alloy layer 502. In various embodiments, the steel layer thickness may be from 0.01%, 0.1% or 1% of the thickness of the vanadium alloy layer 502 and up to 5%, 10%, 15%, 20% or 25% of the thickness of the vanadium alloy layer 502.

Figure 6:
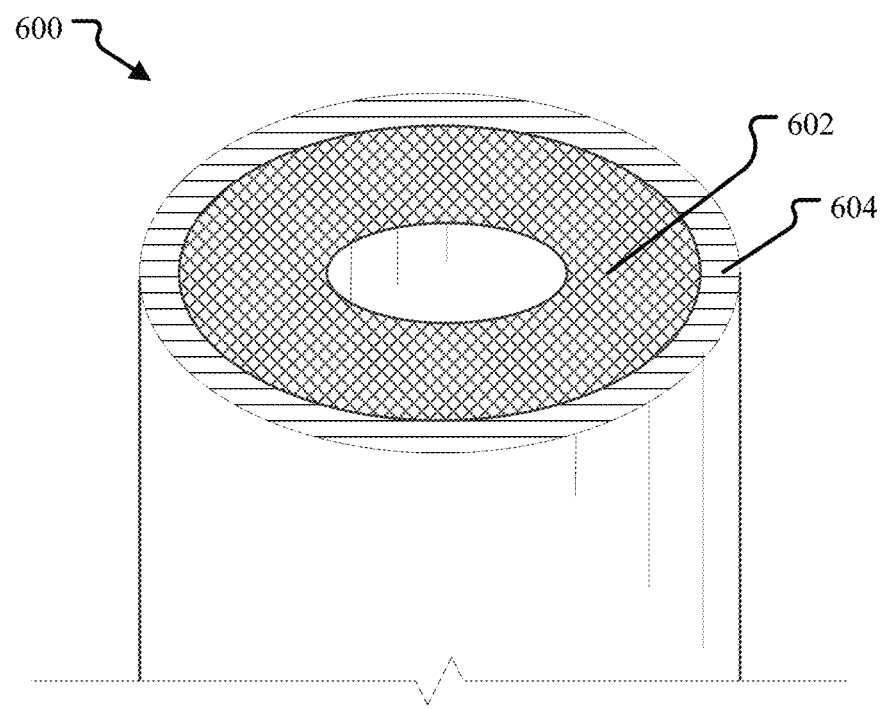
FIG. 6 illustrates a tubular embodiment of the cladding of FIG. 5.

FIG. 6 illustrates a tubular embodiment of the cladding of FIG. 5. In the embodiment shown, the wall element 600 is in the form of a tube with an interior surface and an exterior surface, the first layer 602 of vanadium alloy forming the interior surface of the tube and the second layer 604 of steel forming the exterior surface of the tube. The fuel storage region is in the center region of the tube. Fuel within the tube is thus protected from the reactive external environment at the same time the steel layer 604 is separated from the fuel. Again, the general term wall element is used herein to acknowledge that a tube, vessel or other shape of container may have multiple different walls or sections of a wall of the cladding 500 as illustrated in FIG. 5.

Figure 7:
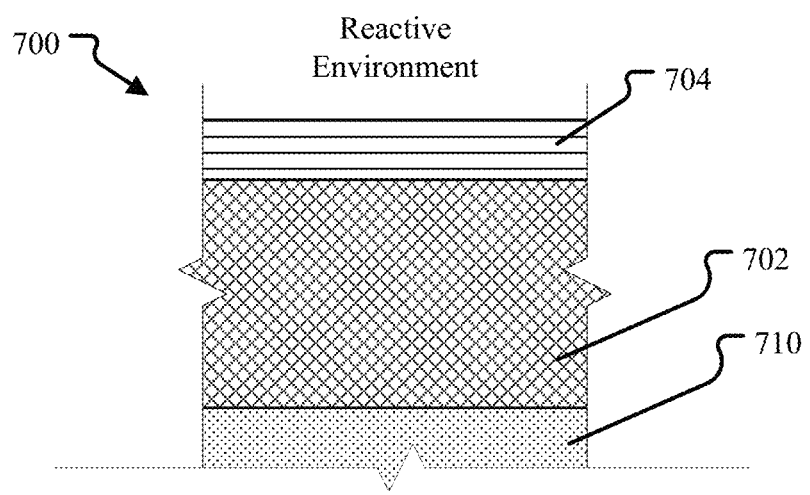
FIG. 7 illustrates the wall element of FIG. 5 in contact with nuclear material.

FIG. 7 illustrates the wall element of FIG. 5, but this time with nuclear material 710, including but not limited to nuclear fuel, in contact with the vanadium layer 702. The steel layer 704, again, may be any thickness from a thin coating up to 50% of the thickness of the vanadium alloy structural layer 702.

Figure 8:
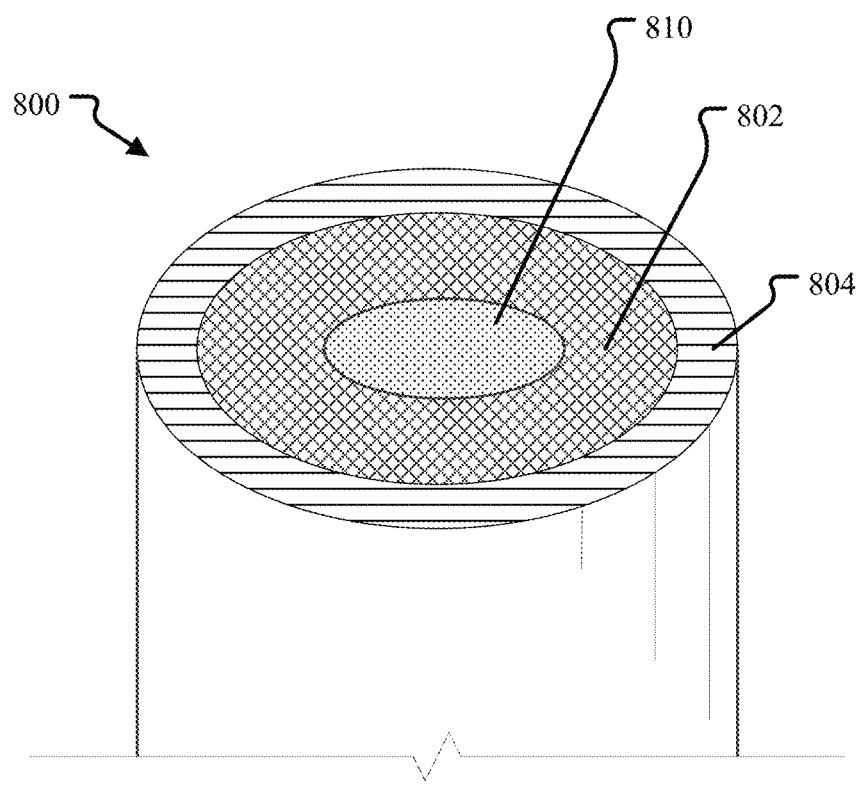
FIG. 8 illustrates a tubular embodiment of the cladding of FIG. 6 with nuclear material contained within the tubular cladding.

FIG. 8, likewise, illustrates a tubular embodiment of the cladding of FIG. 6, but this time with nuclear material 810, including but not limited to nuclear fuel, in the hollow center of the tube 800. The steel layer 804, again, may be any thickness from a thin coating up to 50% of the thickness of the vanadium layer 802; however, the primary structural element is the vanadium alloy layer 802.

In an alternative embodiment, the claddings shown in FIGS. 5-8 may be provided with a third, intermediate layer between the vanadium alloy structural layer and the steel layer to further reduce interaction between the steel and the vanadium alloys. Embodiments of suitable intermediate layers are described below with reference to FIGS. 9-12.

Three Layer Steel-Vanadium Claddings

In addition to the bi-metallic cladding embodiments, tri-metallic versions of the above claddings may also be useful. Tri-metallic cladding embodiments involve providing an intermediate layer between the steel and vanadium layers described above to reduce interaction between the steel and the vanadium layers. These embodiments include claddings in which the steel layer is the structural layer and claddings in which the vanadium layer is vanadium alloy and acts as the structural layer. In either embodiment, the intermediate layer acts as a barrier to prevent interaction between the steel and the vanadium. In the embodiments in which the steel layer the structural element of the cladding, any of the vanadium materials described herein are suitable for the vanadium layer. In FIGS. 9-12, the tri-metallic cladding embodiment having an intermediate layer with a structural steel layer is specifically illustrated; however, the description discusses multiple tri-metallic cladding embodiments.

Figure 9:
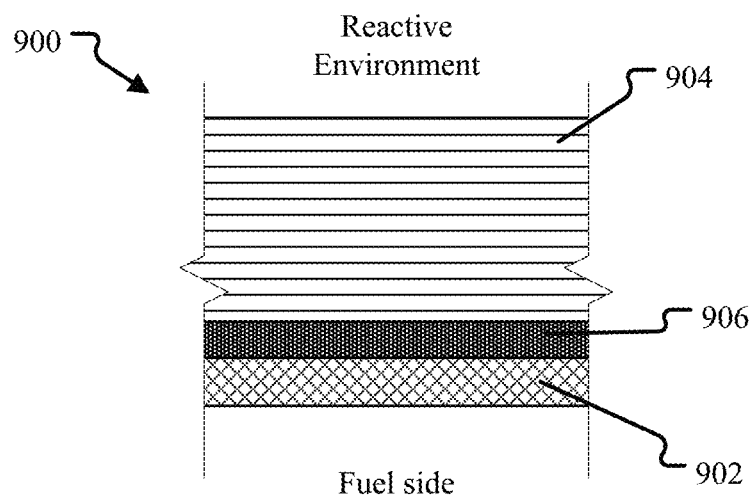
FIG. 9 illustrates a cut away view of a linear section of another embodiment cladding, or wall element, having a three-layer construction.

FIG. 9 illustrates a cut away view of a linear section of another embodiment cladding, or wall element, having a three-layer construction. As with the cladding embodiments discussed above, the vanadium material used in the first layer 902 is again selected to reduce the effects of FCCI on both the properties of the first layer 902 and the fuel to be used in the fuel element. The outer layer 904 is steel, also as described above.

In the cladding 900 illustrated, the middle, or intermediate, layer 906 acts as a liner between the steel layer 904 and the vanadium layer 902. In the embodiment shown, the steel layer 904 is the primary structural component of the fuel cladding 900. In this embodiment the steel layer 904 is the thickest layer in order to provide the structural support for the cladding 900. The steel layer 904 may be 50% or more of the total thickness of the cladding 900. For example, embodiments of the steel layer 904 range from lower bounds of 50, 60, 70, 75, 80, 90, 95, 99 or even 99.9% of the total thickness of the cladding 900. The upper bound is limited to some amount less than 100% in which the middle and vanadium layers are sufficient to provide some protection from FCCI. For example, upper bounds of from 75, 80, 90, 95, 99, 99.9 or even 99.999% of the total thickness of the cladding 900 are contemplated. The balance of the thickness is made up by the other two layers. Thus, in a broad embodiment, the cladding may be considered a thick, steel layer facing the coolant, a thin, fuel-side vanadium alloy or carbon-doped vanadium layer, and a thin, protective layer between the two wherein by 'thin' it is meant no more than 10% of the total thickness of the cladding. For example, specifically in one embodiment the steel layer 904 of the cladding 900 is at least 99% of the total cladding thickness with each of the middle layer 906 and vanadium alloy layer 902 being from 0.0001% to 0.9% of the total cladding thickness.

The materials used in the first layer 902 may be any of those vanadium materials described with reference to FIGS. 1-4 or vanadium alloys described with reference to FIGS. 5-8, above.

Likewise, the materials used in the outer steel layer 904 may be any of those steels described with reference to FIGS. 1-8, above. In one embodiment, for example, the steel is the modified HT9 steel defined above.

The middle layer 906 is made of a material that has less chemical interaction with the vanadium layer 902 than the steel in the steel layer 904 has with the vanadium alloy layer 902. In this way, the middle layer 906 acts as a protective barrier between the fuel-side vanadium layer 902 and the outside steel layer 904.

In an embodiment, the material of the middle layer 906 is selected from nickel, nickel alloy, chromium, chromium alloy, zirconium or zirconium alloy. In nickel embodiments, the material is substantially pure, that is, at least 99.9 wt. % Ni; with the balance other elements, wherein the material includes not greater than 0.05 wt. % of each of these other elements, and wherein the total of these other elements does not exceed 0.1 wt. %. In more pure embodiments, the total of these other elements does not exceed 0.025; 0.01, or 0.005 wt. % of the material. In nickel alloy embodiments, the material is at least 90.0 wt. % Ni; with the balance other elements, wherein the material includes not greater than 5.0 wt. % of each of these other elements, and wherein the total of these other elements does not exceed 10.0 wt. %. In more pure embodiments, the total of these other elements does not exceed 2.5; 1, or 0.5 wt. % of the nickel alloy.

In chromium embodiments, the material is substantially pure, that is, at least 99.9 wt. % Cr; with the balance other elements, wherein the material includes not greater than 0.05 wt. % of each of these other elements, and wherein the total of these other elements does not exceed 0.1 wt. %. In more pure embodiments, the total of these other elements does not exceed 0.025; 0.01, or 0.005 wt. % of the material. In chromium alloy embodiments, the material is at least 90.0 wt. % Cr; with the balance other elements, wherein the material includes not greater than 5.0 wt. % of each of these other elements, and wherein the total of these other elements does not exceed 10.0 wt. %. In more pure embodiments, the total of these other elements does not exceed 5, 2.5; 1, or 0.5 wt. % of the chromium alloy.

In zirconium embodiments, the material is substantially pure, that is, at least 99.9 wt. % Zr; with the balance other elements, wherein the material includes not greater than 0.05 wt. % of each of these other elements, and wherein the total of these other elements does not exceed 0.1 wt. %. In more pure embodiments, the total of these other elements does not exceed 0.025; 0.01, or 0.005 wt. % of the material. In zirconium alloy embodiments, the material is at least 90.0 wt. % Zr; with the balance other elements, wherein the material includes not greater than 5.0 wt. % of each of these other elements, and wherein the total of these other elements does not exceed 10.0 wt. %. In more pure embodiments, the total of these other elements does not exceed 5, 2.5; 1, or 0.5 wt. % of the zirconium alloy.

In the embodiment shown, the steel layer is structural support for the cladding, having thicknesses as described above with reference to FIGS. 1-4, and the middle layer 906 and vanadium layer 902 are the thinner layers of the cladding. In an embodiment not shown, the vanadium layer 902 is the thicker, structural layer, having thicknesses as described with reference FIGS. 5-8, and the middle layer 906 and steel layer 904 are the thinner layers of the cladding. As with FIGS. 1-8, however, the steel layer 904 is the outer layer and the vanadium layer 902 is the inner layer.

Figure 10:
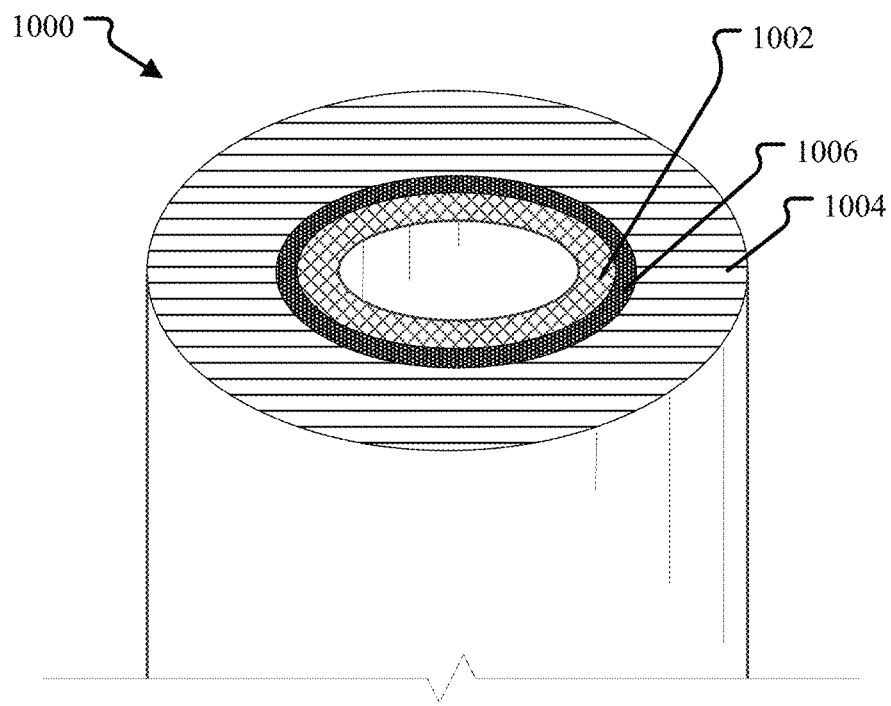
FIG. 10 illustrates a tubular embodiment of the cladding of FIG. 9.

FIG. 10 illustrates a tubular embodiment of the cladding of FIG. 9. In the embodiment shown, the wall element 1000 is in the form of a tube with an interior surface and an exterior surface, the first layer 1002 of vanadium alloy forming the interior surface of the tube and the second layer 1004 of steel forming the exterior surface of the tube, the first and second layers being separated by the middle layer 1006. The fuel storage region is in the center region of the tube. Fuel within the tube is thus protected from the reactive external environment at the same time the steel layer 1004 is separated from the fuel. Again, the general term wall element is used herein to acknowledge that a tube, vessel or other shape of container may have multiple different walls or sections of a wall of the cladding 900 as illustrated in FIG. 9.

Figure 11:
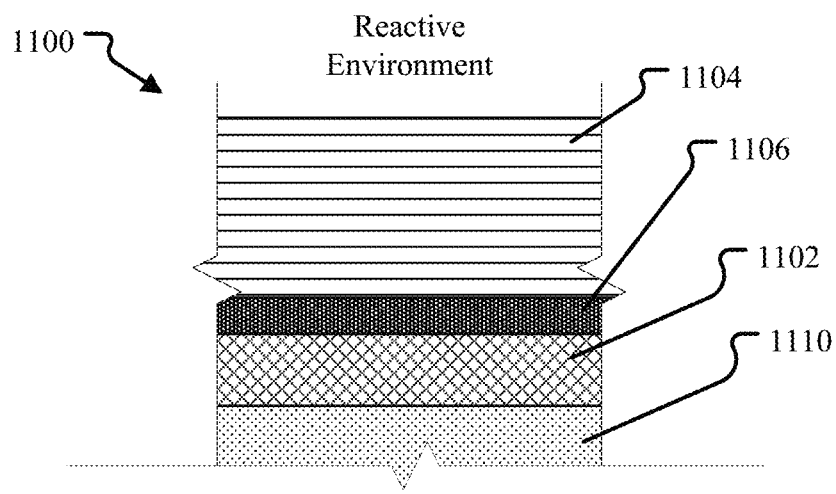
FIG. 11 illustrates the wall element of FIG. 9 in contact with nuclear material.

FIG. 11 illustrates the wall element of FIG. 9, but this time with nuclear material 1110, including but not limited to nuclear fuel, in contact with the vanadium layer 1102 of the wall element 1100. The vanadium layer 1102 is separated from the steel layer 1104 by the middle layer 1106.

Figure 12:
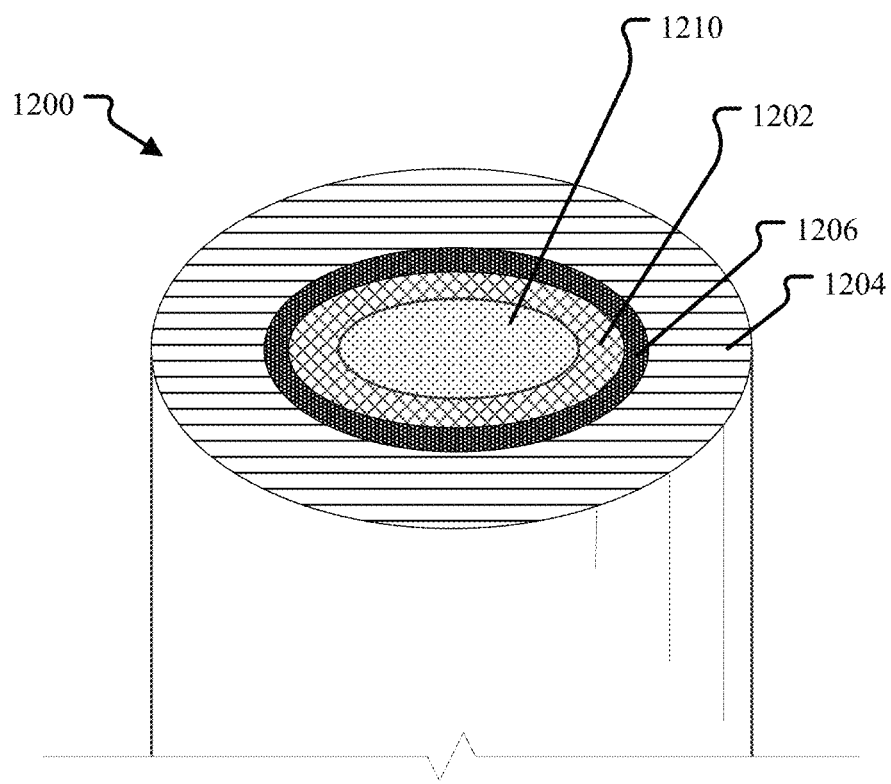
FIG. 12 illustrates a tubular embodiment of the cladding of FIG. 10 containing nuclear material in the hollow center of the tube.

FIG. 12, likewise, illustrates a tubular embodiment of the cladding of FIG. 9, but this time with nuclear material 1210, including but not limited to nuclear fuel, in the hollow center of the tube 1200. Again, the vanadium layer 1202 is separated from the steel layer 1204 by the middle layer 1206.

The three layer steel-vanadium claddings have the benefits of (a) having a steel outer layer to protect the fuel element from exposure to the reactive coolant environment; and (b) the reduced FCCI due to the fuel side vanadium alloy layer. The main structural element may be either of the steel or vanadium layers.

Figure 13:
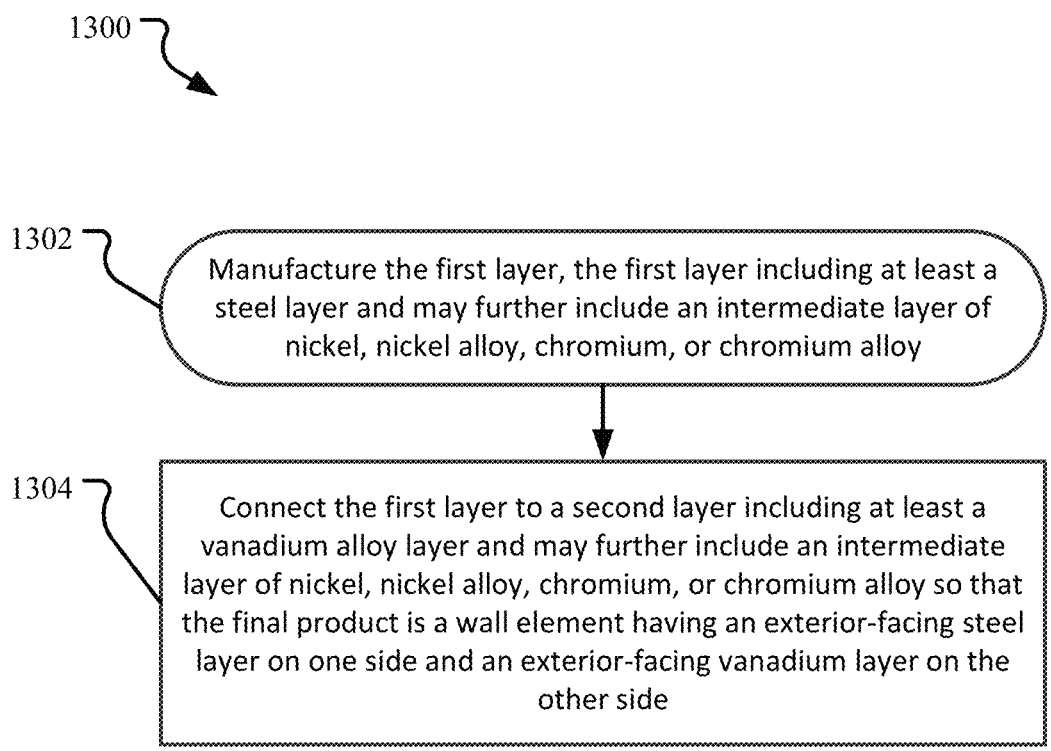
FIG. 13 illustrates a method of manufacturing a two or three layer wall element for separating a nuclear material from an external environment, such as those described above.

FIG. 13 illustrates a method of manufacturing a two or three layer wall element for separating a nuclear material from an external environment, such as those described above. The method 1300 includes manufacturing a first layer, the first layer including at least a steel layer in a first layer manufacturing operation 1302. The first layer is then connected to the second layer that includes at least a layer of vanadium alloy, in a layer connection operation 1304.

In an embodiment of the layer connection operation 1304, the vanadium layer is manufactured prior to connecting the second layer to the first layer. In an alternative embodiment of the layer connection operation 1304, the second layer is created by depositing it onto the first layer.

In an embodiment of the layer connection operation 1304, the second layer consists only of the vanadium alloy layer and includes connecting the steel layer directly to the vanadium alloy layer.

In an embodiment of the first layer construction operation 1302, manufacturing the first layer includes manufacturing a first layer consisting of the steel layer connected to a third layer made of nickel, nickel alloy, chromium, chromium alloy, zirconium or zirconium alloy and the layer connection operation 1304 includes connecting the first layer to the second layer so that the third layer is between the steel layer and the vanadium alloy layer.

In an alternative embodiment, in which the second layer consists of the vanadium alloy layer connected to the third layer of nickel, nickel alloy, chromium, chromium alloy, zirconium or zirconium alloy, the layer connection operation 1304 includes connecting the first layer to the second layer so that the third layer is between the steel layer and the vanadium alloy layer.

Fuel Elements and Fuel Assemblies

Figure 14A:
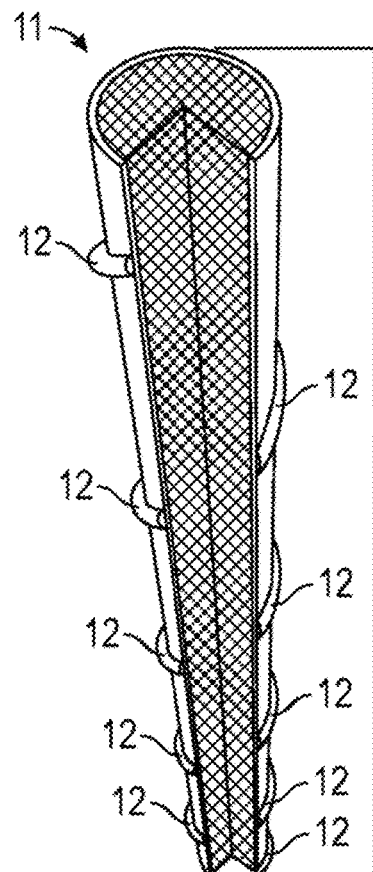
FIGS. 14*a* and 14*b* illustrate a nuclear fuel assembly and details of a fuel element.
Figure 14A:
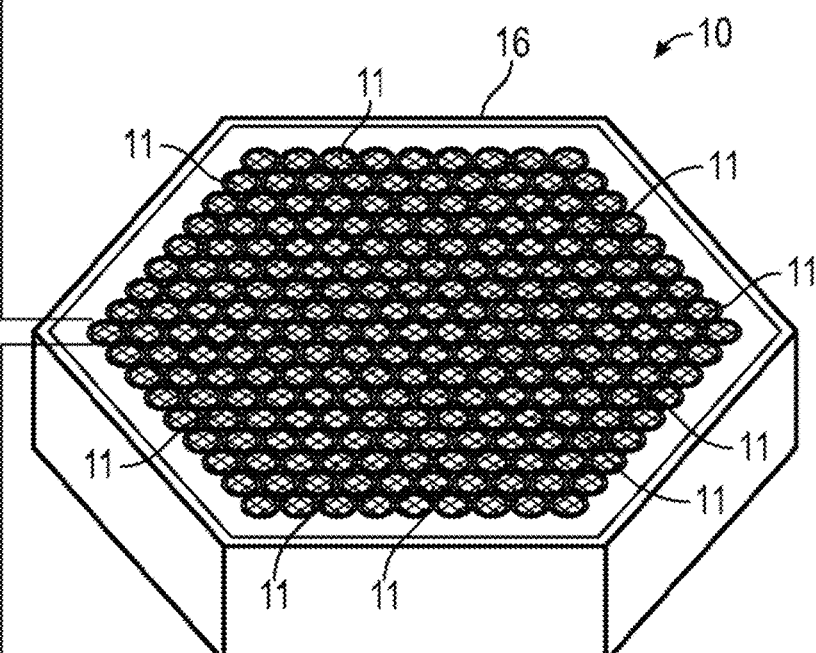
Figure 14B:
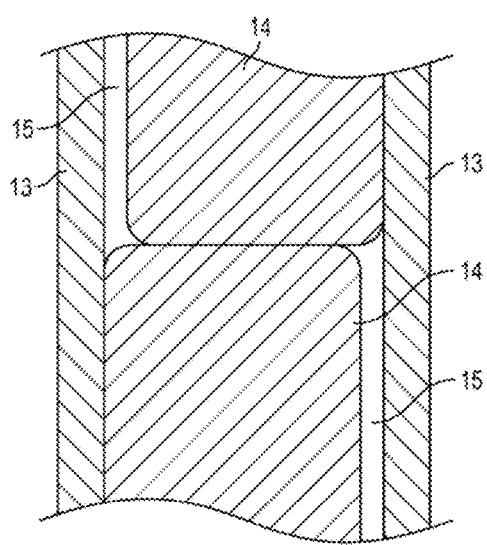

FIG. 14a provides a partial illustration of a nuclear fuel assembly 10 utilizing one or more of the claddings described above. The fuel assembly 10, as shown, includes a number of individual fuel elements (or "fuel rods" or "fuel pins") 11 held within a containment structure 16. FIG. 14b provides a partial illustration of a fuel element 11 in accordance with one embodiment. As shown in this embodiment, the fuel element includes a cladding 13, a fuel 14, and, in some instances, at least one gap 15. Although illustrated as a single element, the cladding 13 is composed of, entirely or at least in part, of the two layer or three layer claddings described above.

A fuel is sealed within a cavity created by the exterior cladding 13. In some instances, the multiple fuel materials may be stacked axially as shown in FIG. 14b, but this need not be the case. For example, a fuel element may contain only one fuel material. In one embodiment, gap(s) 15 may be present between the fuel material and the cladding, though gap(s) need not be present. In one embodiment, the gap is filled with a pressurized atmosphere, such as a pressured helium atmosphere.

In one embodiment, individual fuel elements 11 may have a thin wire 12 from about 0.8 mm diameter to about 1.6 mm diameter helically wrapped around the circumference of the clad tubing to provide coolant space and mechanical separation of individual fuel elements 11 within the housing of the fuel assemblies 10 (that also serve as the coolant duct). In one embodiment, the cladding 13, and/or wire wrap 12 may be fabricated from ferritic-martensitic steel because of its irradiation performance as indicated by a body of empirical data.

The fuel element may have any geometry, both externally and for the internal fuel storage region. For example, in some embodiments shown above, the fuel element is cylindrical and may take the form of a cylindrical rod. In addition, some prismatoid geometries for fuel elements may be particularly efficient. For example, the fuel elements may be right, oblique, or truncated prisms having three or more sides and any polygonal shape for the base. Hexagonal prisms, rectangular prisms, square prisms and triangular prisms are all potentially efficient shapes for packing a fuel assembly.

The fuel elements and fuel assembly may be a part of a power generating reactor, which is a part of a nuclear power plant. Heat generated by the nuclear reaction is used to heat a coolant in contact with the exterior of the fuel elements. This heat is then removed and used to drive turbines or other equipment for the beneficial harvesting of power from the removed heat.

EXAMPLE

Figure 15A:
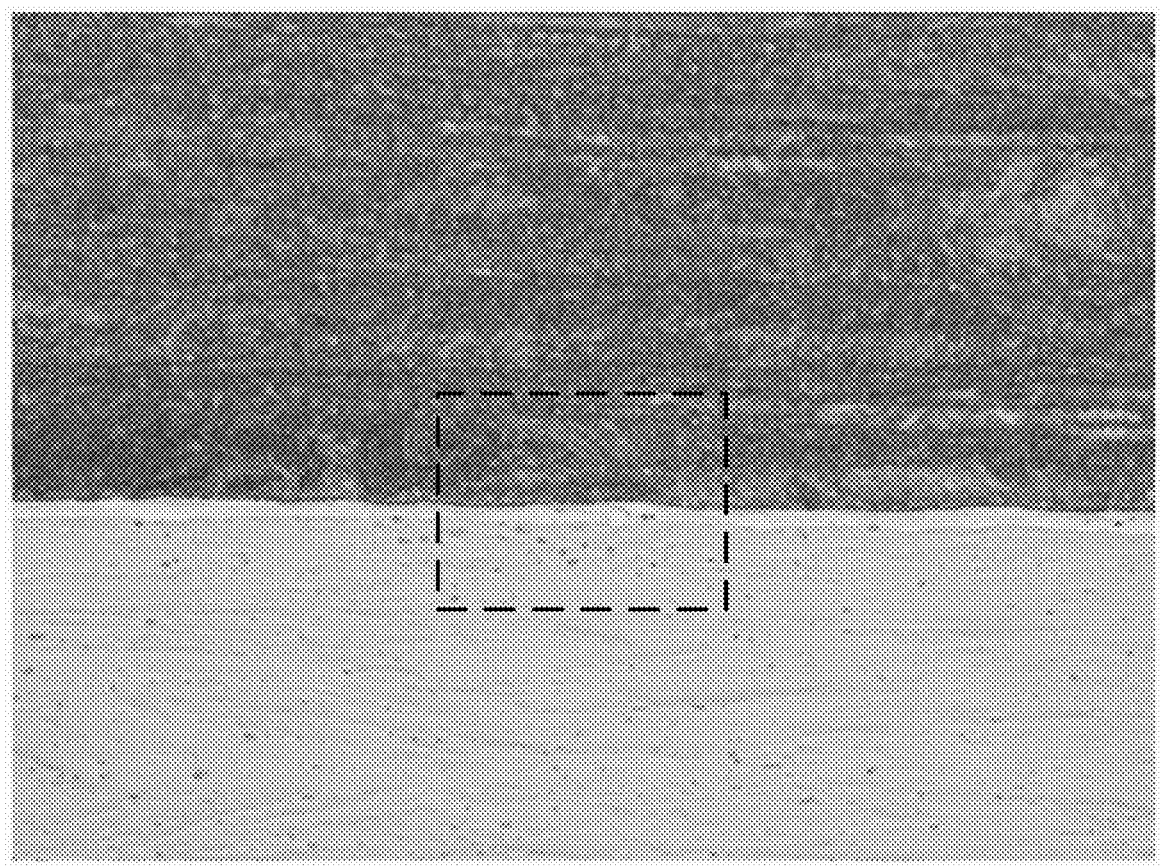
FIGS. 15A and 15B are micrographs of a trimetallic cladding having an intermediate layer of Ni electroplated to a first layer of vanadium doped with carbon on one side and a second layer of HT9 steel on the other.
Figure 15B:

FIGS. 15A and 15B are micrographs of a trimetallic cladding having an intermediate layer of Ni electroplated to a first layer of vanadium doped with carbon on one side and a second layer of HT9 steel on the other. FIG. 15B is an enlargement of the area of the trimetallic cladding shown within the dashed box in FIG. 15A. In the cladding, the vanadium is doped with 0.2 wt. % C.

Figure 15C:
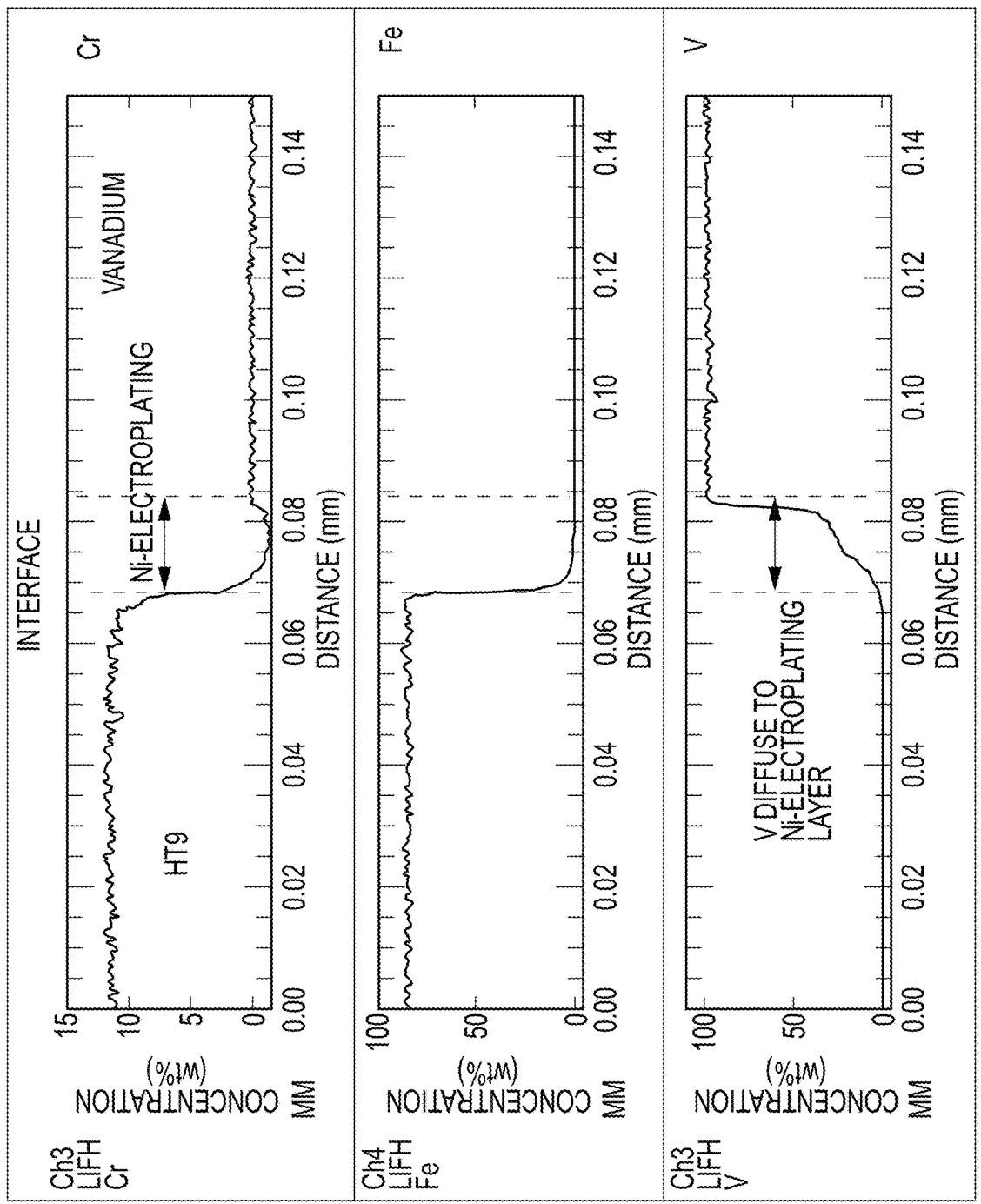
FIGS. 15C and 15D show the chemical composition mapping for the trimetallic claddings of FIGS. 15A and 15B.
Figure 15D:
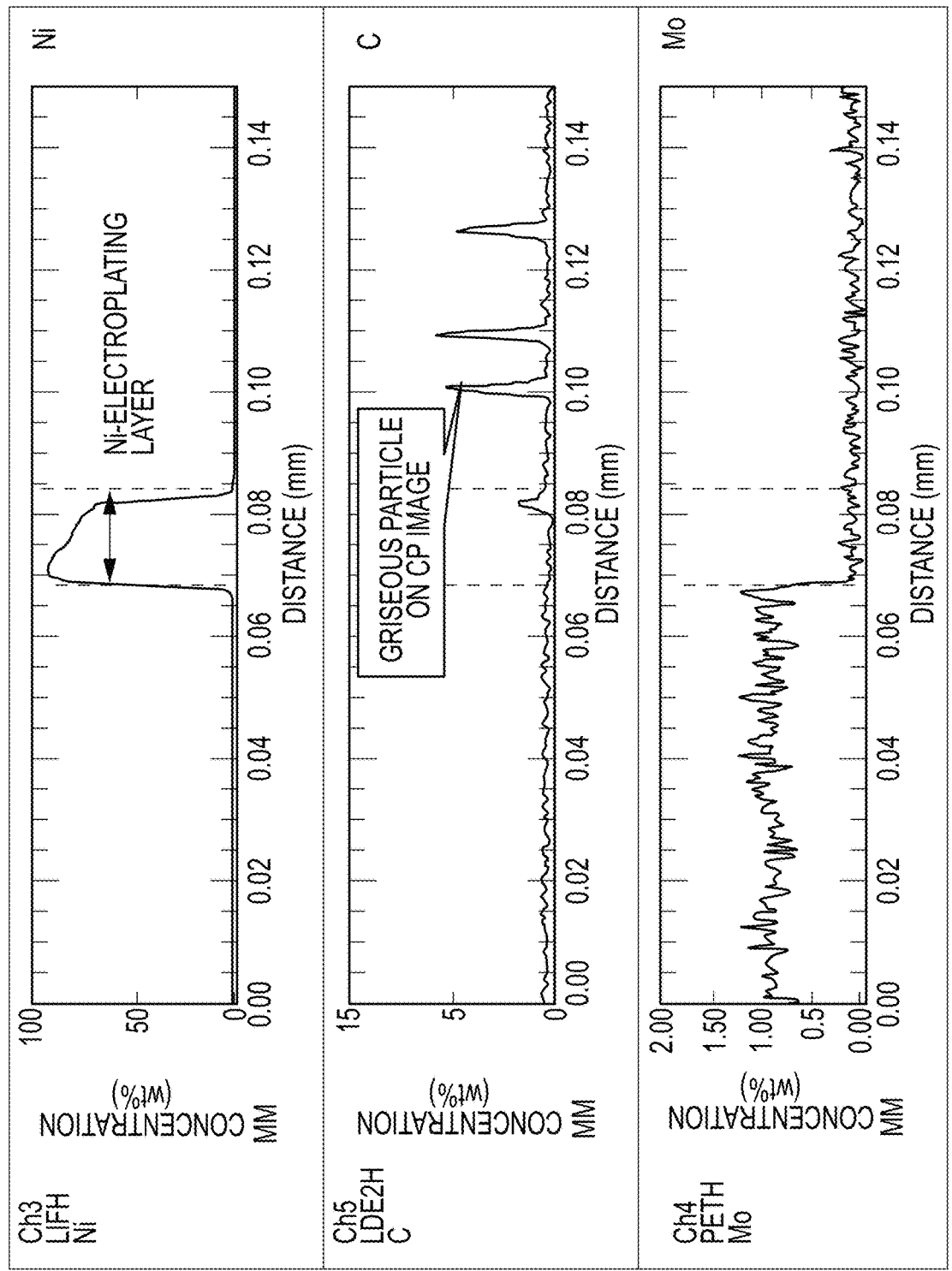

FIGS. 15C and 15D show the chemical composition mapping for the trimetallic claddings of FIGS. 15A and 15B. In FIGS. 15C and 15D the amount and distribution of Cr, Fe, V, Ni, C and Mo through the region around the middle layer are shown. This analysis shows that at least some vanadium diffused into the middle layer, but little or no vanadium made it into the HT9 layer.

Cladding and Fuel Element Manufacturing Methods

Mechanically bonding the cladding-barriers-fuel system reduces the thermal resistance between the fuel and the cladding. This allows for traditional bonding materials to be omitted, such as liquid sodium. In an alternative embodiment, a metallurgical bond between layers of the BEC or fuel element may be formed, such as by pressing (e.g., hot, isostatic pressing), in order to eliminate the gaps between the fuel, barriers, and cladding that cause thermal resistance.

The following discussion recognizes that adjacent layers of a cladding may be connected by a mechanical bond, a metallurgical bond, or a diffusion bond. Mechanically bonded layers refer to layers in which the opposing surfaces are in physical contact. Parts connected by an interference fit are an example of mechanical bonded layers. While mechanically bonded layers may have some gaps and may not be perfect contact along the entire interface, the close proximity and physical contact allows for good thermal energy transfer between the layers. This can be used to remove the need for some sort of thermal transfer material between the layers. Metallurgically bonded layers have been further treated or otherwise processed to create a physical interface between the atoms on the surface of the two layers that is completely or substantially free of gaps, resulting in a discrete interface between the layers. Metallurgical bonds have better thermal energy transfer than mechanical bonds due to the better contact, but still maintain a discrete interface in that there is substantially no interdiffusion of material between the layers. Interfaces created by hot isostatic pressing or vapor deposition are examples of layers connected by a metallurgical bond. Finally, layers may be diffusion bonded in which materials of the two layers are deliberately intermixed to create a zone of diffusion at the interface. In diffusion bonding, there is no clear interface between the two layers, but rather a zone in which the material gradually transitions from that of one layer into that of the other layer. Diffusion bonding changes the material properties within the zone of diffusion while mechanical and metallurgical bonds, on the other hand, do not substantially affect the properties of either layer and maintain a discrete interface between the two layers.

Figure 16:
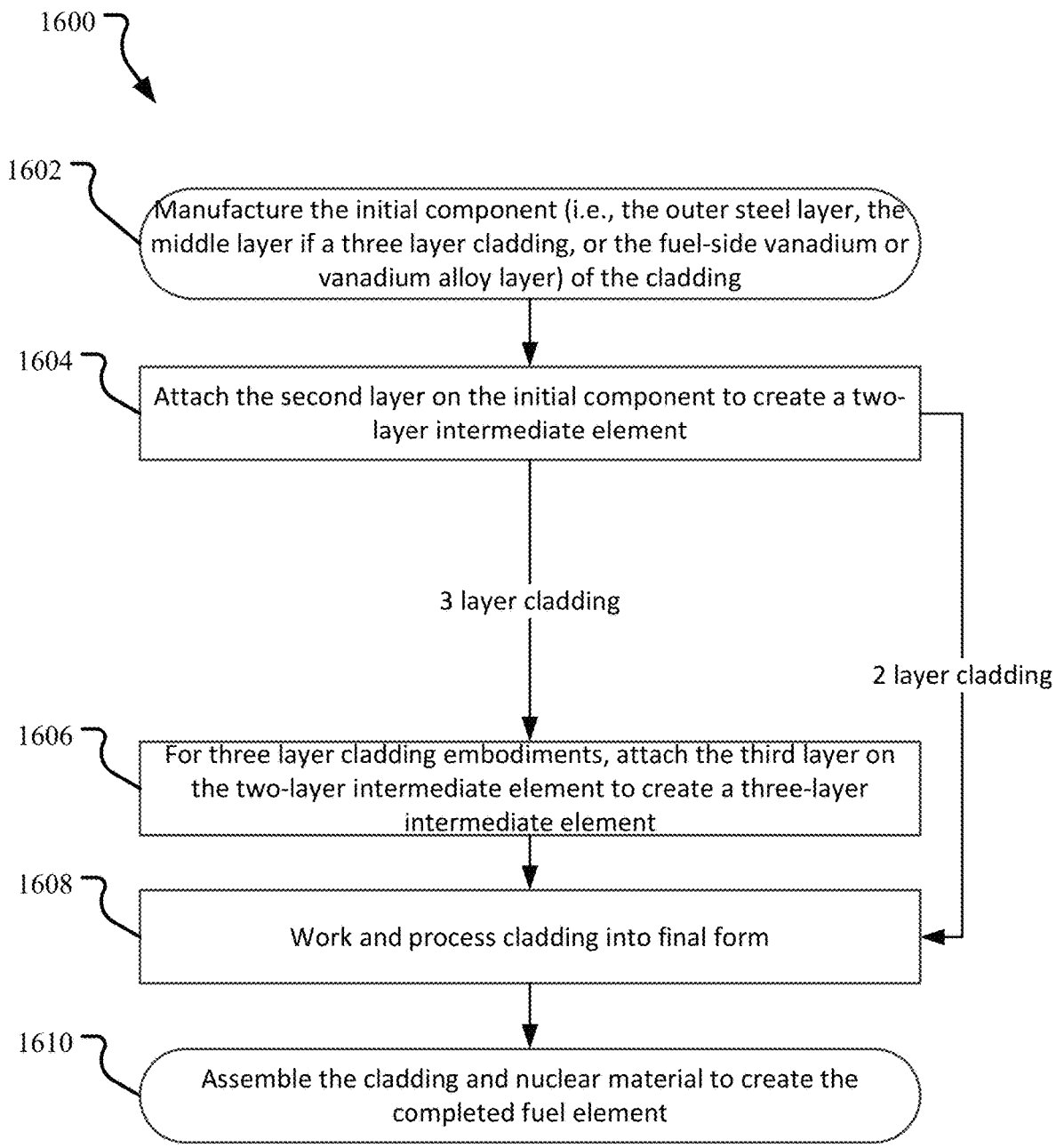
FIG. 16 illustrates at a high-level an embodiment of a method for manufacturing the claddings described above.

FIG. 16 illustrates at a high-level an embodiment of a method for manufacturing the claddings described above. Given a selected set of materials and thicknesses for each of the particular cladding layers, the method 1600 manufactures a final lined cladding and, as a final step, creates a fuel element by putting nuclear material in the lined cladding.

In the embodiment shown, the method 1600 starts with the fabrication of the initial component layer of the cladding in a manufacturing operation 1602. This may be any of the layers previously discussed, i.e., the steel layer, the carbon-doped vanadium layer, structural vanadium alloy layer, or the middle layer if a three-layer cladding is being constructed. This initial component is fabricated in the manufacturing operation 1602 as a stand-alone component of a desired shape to which the other layers may be later attached.

For example, in an embodiment in which the outer cladding layer is an HT9 steel, the manufacturing operation 1602 may include conventional forging of the HT9 steel and drawing it into a tube or sheet. Likewise, in an embodiment in which the structural vanadium alloy is the initial component, manufacturing operation 1602 may include conventional fabrication of vanadium alloy and drawing it into a tube or sheet to create the stand-alone component. Three-dimensional printing may also be used to fabricate the initial component.

After the initial component is manufactured, a second layer attachment operation 1604 is performing in which the second layer is attached to the initial component. In the attachment operation 1604, the first and second layers are mechanically or metallurgically bonded at the interface of the layers. For example, in a tubular embodiment the first and second layers are mechanically or metallurgically bonded together along the perimeter interface of the two layers.

The attachment technique used will be informed by the types of materials being attached. Examples of attachment techniques are discussed in greater detail below. The result is a two-layer intermediate component. For a two layer cladding embodiment, the two-layer intermediate component is either the finished cladding or a billet or other intermediate form that can be worked in the desired final form by the working operation 1608.

For a three layer cladding embodiment, the intermediate component may be one of a) a steel layer and middle layer intermediate, or b) a middle layer and fuel-side liner intermediate. For example, given a desired end cladding of a vanadium fuel-side liner, middle layer, and steel outer layer, the intermediate component may be a vanadium layer/middle layer intermediate or a middle layer/outer steel layer intermediate.

For manufacturing three layer embodiments of the cladding, a third layer attachment operation 1606 is then performed to attach the third layer to the two layer intermediate component. In the third layer attachment operation 1606, the third layer is mechanically or metallurgically bonded to one of the two layers of the two-layer intermediate component. For example, in a tubular embodiment the second and third layers are mechanically or metallurgically bonded together along the perimeter interface of the two layers. This creates the three layer intermediate component which is either the finished three layer cladding or a billet or other intermediate form that can be worked in the desired final form by the working operation 1608.

Figure 17:
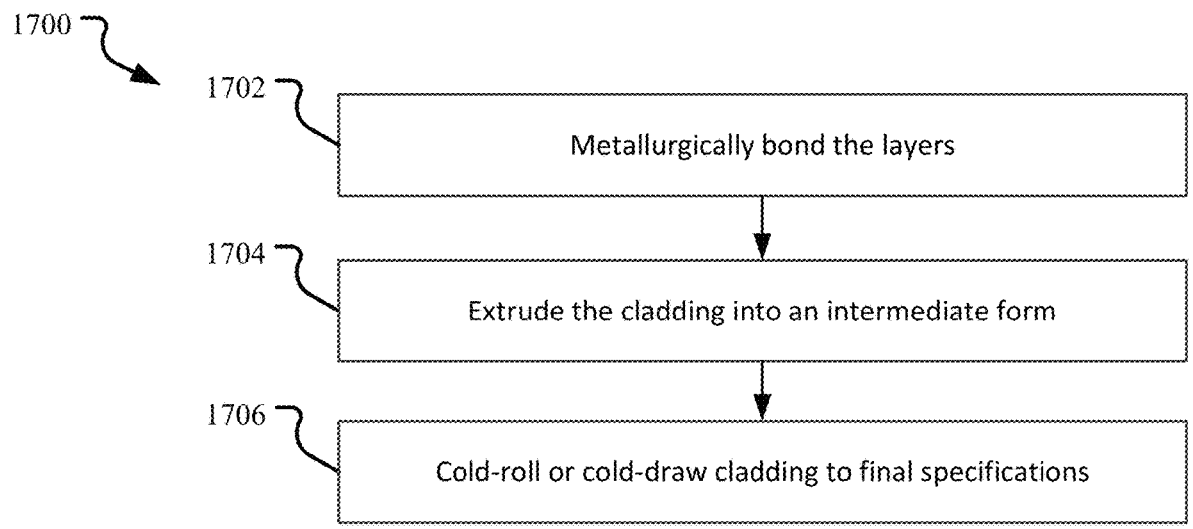
FIG. 17 illustrates an embodiment of the working operation 1608 of FIG. 16.
Figure 18:
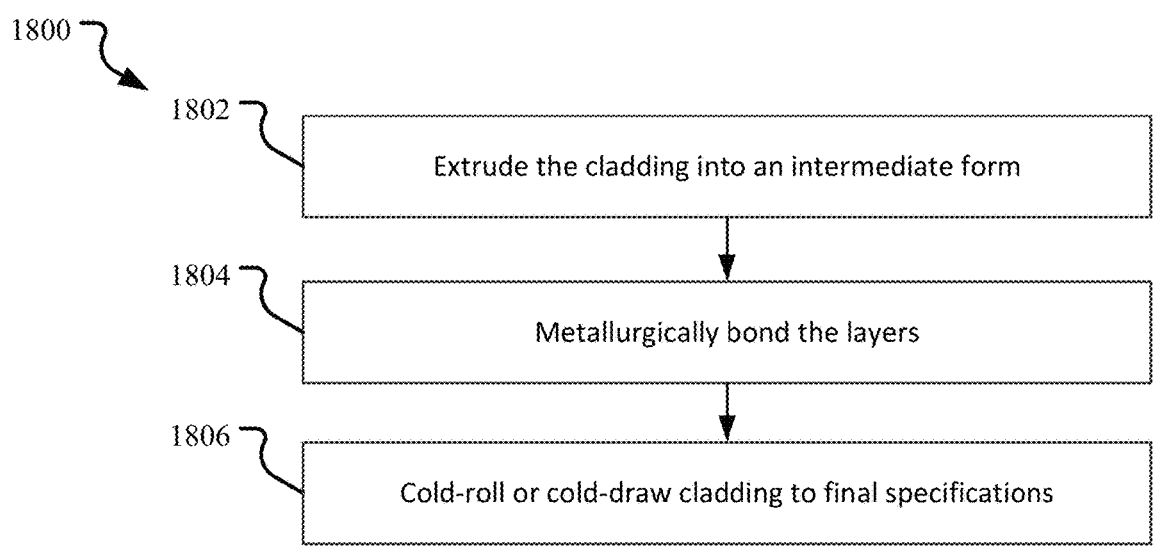
FIG. 18 illustrates an alternative embodiment of the working operation 1608 of FIG. 16.
Figure 19:
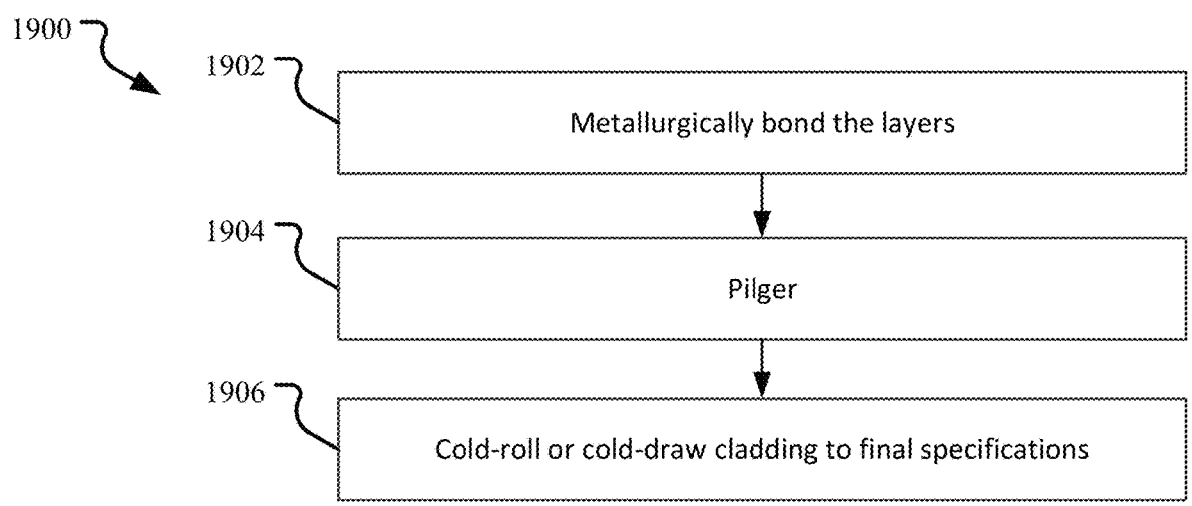
FIG. 19 illustrates yet another alternative embodiment of the working operation 1608 of FIG. 16.

As mentioned above, the working operation 1608 works the cladding into the final form of the cladding (shape, size, layer thicknesses, etc.). This may include any known or later developed working techniques. For example, FIGS. 17-19 illustrate different specific embodiments of the working operation 1608.

The fuel element is then completed in final assembly operation 1610. In this operation the fuel is inserted and, if necessary, the assembled fuel element is worked in the final form. In an embodiment, this may include some final processing or bonding operations to complete the bonding of the fuel to the cladding. For example, in an embodiment the final assembly operation 1610 includes a process that provides a final metallurgical bond between one or more layers that were previously mechanically bonded in an earlier operation.

The final assembly operation 1610 may also include the attachment of any external fittings needed for use. For example, the final assembly operation 1610 may include applying one or more end caps onto the fuel element. Any additional hardware or components may also be provided as part of this operation 1610.

Intermediate anneals may be performed under vacuum or reducing conditions as desired as part of the any of the operations of the method 1600. Final heat treatment including normalization and tempering may also be performed as desired.

As mentioned above, the initial component may be fabricated in the manufacturing operation 1602 in any convention fashion. The later attachment operations 1604, 1606, 1610 include any suitable technique for creating the respective layer of the selected material and attaching it to the initial or intermediate component. In an embodiment, the cladding and barriers are each hermetic to prevent easy migration of gaseous fission products, with no wall-through defects or cracks created during manufacture. Furthermore, the use of mechanical or metallurgical bonds between the layers of the BEC results in good thermal conductivity without the use of thermal bonding materials such as liquid sodium. Examples of suitable techniques, depending on the materials in question, include separate, conventional fabrication, for example, cold drawing or three-dimensional printing, of the layer to be attached and simple mechanical bonding such as by insertion, rolling, press fitting, swaging, co-extrusion, or pilgering (cold or hot). Mechanical attachment techniques may include elevated temperatures (e.g., hot pilgering or hot isostatic press) to assist in the creation of a good attachment between the layers and layers without any cracks or other deformities.

In some cases, using differences in thermal expansion during construction of the fuel element may be possible as part of the final attachment operation 1608. In this way, inner layer(s) and or fuel may be 'slid' into the cladding and reach a desired state once predetermined thermal conditions are met, such as steady state reactor operating temperature, refueling temperature, or the temperature at which the fuel is shipped after manufacturing. Thus, although the embodiments shown in FIGS. 1-4 and 9-12 illustrate the various layers as entirely bonded together along their surfaces of contact, at different points during the manufacturing process this may not be the case, especially when the layers are mechanically bonded together. In addition, although ideal, such a perfect bonding at all points along interfacing surfaces may not be achievable in reality.

Additionally, the barriers may be created and attached by depositing the layer's material onto the target component. This may be achieved by, for example, electroplating; chemical vapor deposition (CVD) specifically, by organo-metallic chemical vapor deposition (OMCVD); or physical vapor deposition (PVD) specifically, thermal evaporation, sputtering, pulsed laser deposition (PLD), cathodic arc, and electrospark deposition (ESD). Each of these attachment techniques are known in the art.

In some embodiments the nuclear material need not be attached to the fuel-side barrier, but rather can just be contained within a container formed, at least in part, by one or more of the cladding embodiments described above. For example, pelletized nuclear fuel may simply be loaded into a cladding in the form of a closed tube or a vessel of some other shape.

Alternatively, metallurgical bonds between one or more layers may be created as part of the method 1600, for example by hot pressing (e.g., hot isostatic pressing). For example, in an embodiment a three-layer intermediate component consisting of a tubular billet of HT9 or other steel layer, a middle layer and a vanadium layer having a center void may be created by either mechanical attachment of separate tubes of material, deposition of materials onto the steel layer, or a combination of both (e.g., deposition of the middle layer onto either a fabricated steel billet or vanadium billet and then assembly of the billets with the middle between the steel and vanadium layers). The rough intermediate form of the cladding may then be hot pressed using constant pressure (hot isostatic pressing) to create a metallurgical bond between the layers of the intermediate. The intermediate component may then be extruded or pilgered (or a combination of both), followed by cold-rolling or cold-drawing into final shape.

For example, a BEC may be manufactured in this way by assembling a tube of cladding material, cladding-side barrier material and fuel-side barrier material and then hot pressing them, followed by an extrusion and cold-rolling or -drawing into the final form factor for the BEC. In an alternative metallurgical bond embodiment, an intermediate component may be extruded or pilgered (or a combination of both) first and then hot pressed to provide the metallurgical bond. The intermediate may then be processed into a final from factor or the form factor needed for subsequent processing steps.

FIG. 17 illustrates an embodiment of the working operation 1608 of FIG. 16. In this embodiment 1700, the two or three layers of a cladding are assembled and then metallurgically bonded in a metallurgical bonding operation 1702. This may include hot isostatic pressing of a tubular or sheet billet of layers. Following the metallurgical bonding, the billet is then hot extruded in an extrusion operation 1704 and subsequently cold-rolled or -drawn in a cold working operation 1706.

FIG. 18 illustrates an alternative embodiment of the working operation 1608 of FIG. 16. In this embodiment 1800, the order of the metallurgical bonding operation 1804 and extrusion operation 1802 are reversed relative to the embodiment shown in FIG. 17, although the method 1800 ends with a final cold-working operation 1806 the same as shown in FIG. 17.

FIG. 19 illustrates yet another alternative embodiment of the working operation 1608 of FIG. 16. In this embodiment, the method 1900 starts with the metallurgical bonding operation 1902. After the bonding, the intermediate component is then pilgered at room temperature in a pilgering operation 1904. The method 1900 ends with a final cold-working operation 1906 the same as shown in FIG. 17.

Notwithstanding the appended claims, the disclosure is also defined by the following clauses:

1. A wall element consisting of:
a first layer of steel;
a second layer of at least 90% vanadium; and
a third layer of nickel, nickel alloy, chromium, chromium alloy, zirconium or zirconium alloy between the first layer and the second layer.

2. The wall element of clause 1, wherein the second layer has a thickness that is from 0.1% to 50% of the thickness of the first layer and the third layer has a thickness that is from 0.1% to 50% of the thickness of the first layer.

3. The wall element of clause 1, wherein the second layer has a thickness that is from 1% to 5% of the thickness of the first layer and the third layer has a thickness that is from 1% to 5% of the thickness of the first layer.

4. The wall element of clauses 1-3, wherein the second layer is selected from the vanadium alloys V-20Ti, V-10Cr-5Ti, V-15Cr-5Ti, V-4Cr-4Ti, V-4Cr-4Ti NIFS Heats 1& 2, V-4Cr-4Ti US Heats 832665 & 8923864, and V-4Cr-4Ti Heat CEA-J57.

5. The wall element of clause 4, wherein the second layer is V-4Cr-4Ti.

6. The wall element of clause 4, wherein the second layer consists of:
3.0-5.0 wt. % Cr;
3.0-5.0 wt. % Ti; and
no more than 0.02 wt. % C;
with the balance being V and other elements, wherein the vanadium alloy includes not greater than 0.1 wt. % of each of these other elements, and wherein the total of these other elements does not exceed 0.5 wt. %.

7. The wall element of clause 5, wherein the second layer consists of:
3.5-4.5 wt. % Cr;
3.5-4.5 wt. % Ti;
0.04-0.1 wt. % Si;
up to 0.02 wt. % 0;
up to 0.02 wt. % N;
up to 0.02 wt. % C;
up to 0.02 wt. % Al;
up to 0.02 wt. % Fe;
up to 0.001 wt. % Cu;
up to 0.001 wt. % Mo;
up to 0.001 wt. % Nb;
up to 0.001 wt. % P;
up to 0.001 wt. % S; and
no more than 0.0002 wt. % Cl;
with the balance being V and other elements, wherein the vanadium alloy includes not greater than 0.001 wt. % of each of these other elements, and wherein the total of these other elements does not exceed 0.01 wt. %.

8. The wall element of clauses 1-4, wherein the second layer consists of:
0.001-0.5 wt. % C;
the balance being V and other elements, wherein the second layer includes not greater than 0.1 wt. % of each of these other elements, and wherein the total of these other elements does not exceed 0.5 wt. %.

9. The wall element of clause 8, wherein the second layer includes from 0.1 to 0.3 wt. % C in addition to V.

10. The wall element of any of clauses 1-9, wherein the steel of the first layer is selected from a tempered martensitic steel, a ferritic steel, an austenitic steel, an oxide-dispersion strengthened steel, T91 steel, T92 steel, HT9 steel, 316 steel, and 304 steel.

11. The wall element of any of clauses 1-10, wherein the steel of the first layer consists of:
9.0-12.0 wt. % Cr;
0.001-2.5 wt. % W;
0.001-2.0 wt. % Mo;
0.001-0.5 wt. % Si;
up to 0.5 wt. % Ti;
up to 0.5 wt. % Zr;
up to 0.5 wt. % V;
up to 0.5 wt. % Nb;
up to 0.3 wt. % Ta;
up to 0.1 wt. % N;

up to 0.3 wt. % C;
up to 0.01 wt. % B;
the balance being Fe and other elements, wherein the steel includes not greater than 0.15 wt. % of each of these other elements, and wherein the total of these other elements does not exceed 0.35 wt. %.

12. The wall element of any of clauses 1-11, wherein the steel includes one or more of carbide precipitates of Ti, Zr, V, Nb, Ta or B, nitride precipitates of Ti, Zr, V, Nb, or Ta, and/or carbo-nitride precipitates of Ti, Zr, V, Nb, or Ta.

13. The wall element of any of clauses 5-7, wherein the vanadium alloy includes one or more carbide precipitates of Cr, Ti and/or other elements.

14. The wall element of any of clauses 1-13, wherein the first layer is at least 99% of the total thickness of the wall element and wherein with each of the third layer and second layer being from 0.0001% to 0.5% of the thickness of the first layer.

15. The wall element of any of clauses 1-14, wherein the wall element is in the form of a tube with an interior surface and an exterior surface, the first layer forming the interior surface of the tube and the second layer forming the exterior surface of the tube.

16. The wall element of any of clauses 1-15, wherein the third layer consists of:
at least 99.9 wt. % Ni;
with the balance other elements, wherein the material includes not greater than 0.05 wt. % of each of these other elements, and wherein the total of these other elements does not exceed 0.1 wt. %.

17. The wall element of any of clauses 1-15, wherein the third layer consists of:
at least 90.0 wt. % Ni;
with the balance other elements, wherein the material includes not greater than 1.0 wt. % of each of these other elements, and wherein the total of these other elements does not exceed 5.0 wt. %.

18. The wall element of any of clauses 1-15, wherein the third layer consists of:
at least 99.9 wt. % Cr;
with the balance other elements, wherein the material includes not greater than 0.05 wt. % of each of these other elements, and wherein the total of these other elements does not exceed 0.1 wt. %.

19. The wall element of any of clauses 1-15, wherein the third layer consists of:
at least 90.0 wt. % Cr;
with the balance other elements, wherein the material includes not greater than 1.0 wt. % of each of these other elements, and wherein the total of these other elements does not exceed 5.0 wt. %.

20. The wall element of any of clauses 1-15, wherein the third layer consists of:
at least 99.9 wt. % Zr;
with the balance other elements, wherein the material includes not greater than 0.05 wt. % of each of these other elements, and wherein the total of these other elements does not exceed 0.1 wt. %.

21. The wall element of any of clauses 1-15, wherein the third layer consists of:
at least 90.0 wt. % Zr;
with the balance other elements, wherein the material includes not greater than 1.0 wt. % of each of these other elements, and wherein the total of these other elements does not exceed 5.0 wt. %.

22. A container made, at least in part, from wall elements of any of clauses 1-21.

23. A container for holding a nuclear fuel comprising:
at least one wall element separating a fuel storage volume from an external environment;
the wall element having a first layer of steel separated from a second layer of at least 90% vanadium by a third layer between the first layer and the second layer;
the first layer of the wall contacting the external environment and the second layer contacting and the fuel storage volume; and
wherein the third layer consists of nickel, nickel alloy, chromium, chromium alloy, zirconium or zirconium alloy.

24. The container of clause 23, wherein the container has a shape that is defined by one or more continuously connected wall elements to form a vessel.

25. The container of clause 23, wherein the container is shaped as a cylindrical tube, at least one wall element forming a cylindrical wall of the tube and the fuel storage region being the inside of the tube.

26. The container of any of clauses 23-25, wherein the container includes a bottom wall and one or more sidewalls and at least one wall element forms a bottom wall or sidewall of the container.

27. An article, comprising:
an amount of nuclear material;
a wall element disposed exterior to the nuclear fuel and separating at least some of the nuclear material from an exterior environment, the wall element consisting of:
a first layer of steel in contact with the external environment; and
a second layer of at least 90% vanadium in contact with the nuclear material; and
a third layer between the first layer and the second layer, the first layer of nickel inhibiting the transfer of carbon from the steel into the vanadium alloy;
wherein the third layer consists of nickel, nickel alloy, chromium, chromium alloy, zirconium or zirconium alloy.

28. The article of clause 27, wherein the nuclear material includes at least one of U, Th, Am, Np, and Pu.

29. The article of clause 27 or 28, wherein the nuclear material includes at least one refractory material chosen from Nb, Mo, Ta, W, Re, Zr, V, Ti, Cr, Ru, Rh, Os, Ir, Nd, and Hf.

30. The article of any of clauses 27-29, wherein the first layer includes a steel, substantially all of which has at least one phase chosen from a tempered martensite phase, a ferrite phase, and an austenitic phase.

31. The article of any of clauses 27-30, wherein the cladding layer includes at least one steel chosen from a martensitic steel, a ferritic steel, an austenitic steel, an oxide-dispersed steel, T91 steel, T92 steel, HT9 steel, 346 steel, and 304 steel.

32. The article of any of clauses 27-31, wherein the nuclear fuel and the wall element are mechanically bonded.

33. The article of any of clauses 27-32, wherein the exterior environment includes molten sodium and the first layer of steel prevents contact between the sodium and the vanadium in the second layer.

34. The article of any of clauses 27-33, wherein the first layer and the second layer are mechanically bonded to opposite sides of the third layer.

35. The article of any of clauses 27-34, wherein the nuclear material includes at least 90 wt. % of U.

36. The article of any of clauses 27-35, wherein the nuclear material is a nuclear fuel and the article is a nuclear fuel element.

37. The article of any of clauses 27-36, wherein the third layer consists of:
  at least 99.9 wt. % Ni;
  with the balance other elements, wherein the material includes not greater than 0.05 wt. % of each of these other elements, and wherein the total of these other elements does not exceed 0.1 wt. %.
38. The article of any of clauses 27-36, wherein the third layer consists of:
  at least 90.0 wt. % Ni;
  with the balance other elements, wherein the material includes not greater than 5.0 wt. % of each of these other elements, and wherein the total of these other elements does not exceed 10.0 wt. %.
39. The article of any of clauses 27-36, wherein the third layer consists of:
  at least 99.9 wt. % Cr;
  with the balance other elements, wherein the material includes not greater than 0.05 wt. % of each of these other elements, and wherein the total of these other elements does not exceed 0.1 wt. %.
40. The article of any of clauses 27-36, wherein the third layer consists of:
  at least 90.0 wt. % Cr;
  with the balance other elements, wherein the material includes not greater than 5.0 wt. % of each of these other elements, and wherein the total of these other elements does not exceed 10.0 wt. %.
41. The w article of any of clauses 27-36, wherein the second layer consists of:
  0.001-0.5 wt. % C;
  the balance being V and other elements, wherein the second layer includes not greater than 0.1 wt. % of each of these other elements, and wherein the total of these other elements does not exceed 0.5 wt. %.
42. A wall element consisting of:
  a first layer of steel;
  a second layer of vanadium doped with at least 0.001 wt. % carbon on the first layer of steel, the second layer having no more than 0.5 wt. % of other elements besides V and C.
43. The wall element of clause 42 comprising:
  a third layer between the first layer and the second layer, the third layer being made of nickel, nickel alloy, chromium, chromium alloy, zirconium or zirconium alloy.
44. The wall element of clause 42 or 43, wherein the second layer consists of:
  0.001-0.5 wt. % C;
  the balance being V and other elements, wherein the doped vanadium of the second layer includes not greater than 0.1 wt. % of each of these other elements, and wherein the total of these other elements does not exceed 0.5 wt. %.
45. The wall element of any of clauses 42-44, wherein the doped vanadium of the second layer includes from 0.1 to 0.3 wt. % C.
46. The wall element of any of clauses 42-45, wherein the steel of the first layer is selected from a tempered martensitic steel, a ferritic steel, an austenitic steel, an oxide-dispersion strengthened steel, T91 steel, T92 steel, HT9 steel, 316 steel, and 304 steel.
47. The wall element of any of clauses 42-46, wherein the steel of the first layer consists of:
  9.0-12.0 wt. % Cr;
  0.001-2.5 wt. % W;
  0.001-2.0 wt. % Mo;
  0.001-0.5 wt. % Si;
  up to 0.5 wt. % Ti;
  up to 0.5 wt. % Zr;
  up to 0.5 wt. % V;
  up to 0.5 wt. % Nb;
  up to 0.3 wt. % Ta;
  up to 0.1 wt. % N;
  up to 0.3 wt. % C;
  up to 0.01 wt. % B;
  the balance being Fe and other elements, wherein the steel includes not greater than 0.15 wt. % of each of these other elements, and wherein the total of these other elements does not exceed 0.35 wt. %.
48. The wall element of any of clauses 42-47, wherein the steel includes one or more of carbide precipitates of Ti, Zr, V, Nb, Ta or B, nitride precipitates of Ti, Zr, V, Nb, or Ta, and/or carbo-nitride precipitates of Ti, Zr, V, Nb, or Ta and/or wherein the vanadium alloy includes one or more carbide precipitates of Cr, Ti and/or other elements.
49. The wall element of clause 42, wherein the second layer has a thickness that is from 0.1% to 50% of the thickness of the first layer.
50. The wall element of any of clauses 42-49, wherein the second layer has a thickness that is from 1% to 5% of the thickness of the first layer.
51. The wall element of any of clauses 42-50, wherein the wall element is in the form of a tube with an interior surface and an exterior surface, the first layer forming the interior surface of the tube and the second layer forming the exterior surface of the tube.
52. The wall element of clause 51 further comprising:
  an amount of nuclear material within the tube.
53. The article of clause 52, wherein the nuclear material includes one or more elements selected from U, Th, Am, Np, and Pu.
54. The article of clause 52 or 53, wherein the nuclear material includes at least one refractory material chosen from Nb, Mo, Ta, W, Re, Zr, V, Ti, Cr, Ru, Rh, Os, Ir, Nd, and Hf.
55. A container for holding a nuclear fuel comprising:
  at least one wall element separating a fuel storage region from an external environment;
  the wall element having a first layer of steel attached to a second layer of vanadium doped with at least 0.001 wt. % carbon and having no more than 0.5 wt. % of other elements.
  the first layer of the wall contacting the external environment and the second layer contacting the fuel storage region.
56. The container of clause 55, wherein the container has a shape that is defined by one or more continuously connected wall elements to form a vessel.
57. The container of clauses 55 or 56, wherein the container is shaped as a cylindrical tube, at least one wall element forming a cylindrical wall of the tube and the fuel storage region being the inside of the tube.
58. The container of any of clauses 55-57, wherein the container includes a bottom wall and one or more sidewalls and at least one wall element forms a bottom wall of the container.
59. The container of any of clauses 55-58, wherein the container includes a bottom wall and one or more sidewalls and at least one wall element forms at least one of the one or more sidewalls of the container.
60. A wall element consisting of:
  a first layer of steel;
  a second layer of vanadium alloy on the first layer of steel, wherein the first layer of steel is from 0.1% to 50% of the thickness of the second layer.

61. The wall element of clause 60 comprising:
a third layer between the first layer and the second layer, the third layer being made of nickel, nickel alloy, chromium, chromium alloy, zirconium or zirconium alloy.

62. The wall element of clauses 60 or 61, wherein the second layer is selected from the vanadium alloys V-20Ti, V-10Cr-5Ti, V-15Cr-5Ti, V-4Cr-4Ti, V-4Cr-4Ti NIFS Heats 1& 2, V-4Cr-4Ti US Heats 832665 & 8923864, and V-4Cr-4Ti Heat CEA-J57.

63. The wall element of clause 62, wherein the second layer consists of:
3.0-5.0 wt. % Cr;
3.0-5.0 wt. % Ti; and
no more than 0.02 wt. % C;
with the balance being V and other elements, wherein the vanadium alloy includes not greater than 0.1 wt. % of each of these other elements, and wherein the total of these other elements does not exceed 0.5 wt. %.

64. The wall element of clause 62, wherein the second layer consists of:
3.5-4.5 wt. % Cr;
3.5-4.5 wt. % Ti;
0.04-0.1 wt. % Si;
up to 0.02 wt. % O;
up to 0.02 wt. % N;
up to 0.02 wt. % C;
up to 0.02 wt. % Al;
up to 0.02 wt. % Fe;
up to 0.001 wt. % Cu;
up to 0.001 wt. % Mo;
up to 0.001 wt. % Nb;
up to 0.001 wt. % P;
up to 0.001 wt. % S; and
no more than 0.0002 wt. % Cl;
with the balance being V and other elements, wherein the vanadium alloy includes not greater than 0.001 wt. % of each of these other elements, and wherein the total of these other elements does not exceed 0.01 wt. %.

65. The wall element of any of clauses 60-64, wherein the steel of the first layer is selected from a tempered martensitic steel, a ferritic steel, an austenitic steel, an oxide-dispersion strengthened steel, T91 steel, T92 steel, HT9 steel, 316 steel, and 304 steel.

66. The wall element of clauses 60-64, wherein the steel of the first layer consists of:
9.0-12.0 wt. % Cr;
0.001-2.5 wt. % W;
0.001-2.0 wt. % Mo;
0.001-0.5 wt. % Si;
up to 0.5 wt. % Ti;
up to 0.5 wt. % Zr;
up to 0.5 wt. % V;
up to 0.5 wt. % Nb;
up to 0.3 wt. % Ta;
up to 0.1 wt. % N;
up to 0.3 wt. % C;
up to 0.01 wt. % B;
the balance being Fe and other elements, wherein the steel includes not greater than 0.15 wt. % of each of these other elements, and wherein the total of these other elements does not exceed 0.35 wt. %.

67. The wall element of any of clauses 60-66, wherein the steel includes one or more of carbide precipitates of Ti, Zr, V, Nb, Ta or B, nitride precipitates of Ti, Zr, V, Nb, or Ta, and/or carbo-nitride precipitates of Ti, Zr, V, Nb, or Ta and/or wherein the vanadium alloy includes one or more carbide precipitates of Cr, Ti and/or other elements.

68. The wall element of any preceding clause, wherein the first layer has a thickness that is from 1% to 5% of the thickness of the second layer.

69. The wall element of any preceding clause, wherein the wall element is in the form of a tube with an interior surface and an exterior surface, the first layer forming the interior surface of the tube and the second layer forming the exterior surface of the tube.

70. A container for holding a nuclear fuel comprising:
at least one wall element separating a fuel storage region from an external environment;
the wall element having a first layer of steel attached to a second layer of vanadium alloy, wherein the first layer of steel is from 0.1% to 50% of the thickness of the second layer;
the first layer of the wall contacting the external environment and the second layer contacting the fuel storage region.

71. The container of clause 70, wherein the container has a shape that is defined by one or more continuously connected wall elements to form a vessel.

72. The container of clause 70 or 71, wherein the container is shaped as a cylindrical tube, at least one wall element forming a cylindrical wall of the tube and the fuel storage region being the inside of the tube.

73. The container of any of clauses 70-72, wherein the container includes a bottom wall and one or more sidewalls and at least one wall element forms a bottom wall of the container.

74. The container of any of clauses 70-73, wherein the container includes a bottom wall and one or more sidewalls and at least one wall element forms at least one of the one or more sidewalls of the container.

75. An article, comprising:
an amount of nuclear material;
a wall element disposed exterior to the nuclear fuel and separating at least some of the nuclear material from an exterior environment, the wall element consisting of:
a first layer of steel; and
a second layer of vanadium alloy between the first layer and the nuclear material, wherein the first layer of steel is from 0.1% to 50% of the thickness of the second layer and the first layer of steel separates the second layer from the exterior environment.

76. The article of clause 75, wherein the nuclear material includes at least one of U, Th, Am, Np, and Pu.

77. The article of clauses 75 or 76, wherein the first layer includes at least one steel chosen from a martensitic steel, a ferritic steel, an austenitic steel, an oxide-dispersed steel, T91 steel, T92 steel, HT9 steel, 316 steel, and 304 steel.

78. The article of any of clauses 75-77, wherein the nuclear fuel and the wall element are mechanically bonded.

79. The article of any of clauses 75-78, wherein the exterior environment includes molten sodium and the first layer of steel prevents contact between the sodium and the vanadium alloy in the second layer.

80. The article of any of clauses 75-79, wherein the first layer and the second layer are mechanically bonded.

81. The article of any of clauses 75-80, wherein the nuclear material includes at least 90 wt. % of U.

82. The article of any of clauses 75-81, wherein the nuclear material is nuclear fuel and the article is a nuclear fuel element.

83. A power-generating reactor including the article of any of clauses 27-41 and 75-82.

84. A method of manufacturing a wall element for separating a nuclear material from an external environment, the method comprising:

manufacturing a first layer, the first layer including at least a steel layer; and connecting the first layer to a second layer, the second layer including at least a vanadium alloy layer.

85. The method of clause 84 further comprising:

manufacturing the second layer prior to connecting the second layer to the first layer.

86. The method of clauses 84 or 85, wherein connecting further comprises:

connecting the steel layer to the vanadium alloy layer.

87. The method of any of clauses 84-86, wherein manufacturing the first layer includes manufacturing a first layer consisting of the steel layer connected to a chromium layer and connecting includes connecting the first layer to the second layer so that the chromium layer is between the steel layer and the vanadium alloy layer.

88. The method of any of clauses 84-87, wherein the second layer consists of the vanadium alloy layer connected to the chromium layer and connecting includes the first layer to the second layer so that the chromium layer is between the steel layer and the vanadium alloy layer.

89. A steel-middle layer-vanadium cladding manufacturing method comprising:

fabricating a steel tube;

fabricating a vanadium tube of carbon-doped vanadium or vanadium alloy;

depositing one of nickel, nickel alloy, chromium, chromium alloy, zirconium or zirconium alloy one either the inside of the steel tube or the outside of the vanadium tube;

inserting the vanadium tube into the steel tube thereby creating a steel-middle layer-vanadium intermediate tube;

metallurgical bonding the steel-middle layer-vanadium intermediate tube;

pilgering or extruding the steel-middle layer-vanadium intermediate tube; and cold working the steel-middle layer-vanadium intermediate tube after the metallurgical bonding and pilgering or extruding operations to obtain a steel-middle layer-vanadium cladding.

90. The steel-middle layer-vanadium cladding manufacturing method of clause 89, wherein the steel-middle layer-vanadium cladding consists of:

an outer layer of steel;

a inner layer of at least 90% vanadium; and a middle layer of nickel, nickel alloy, chromium, chromium alloy, zirconium or zirconium alloy between the outer layer and the inner layer.

91. The steel-middle layer-vanadium cladding manufacturing method of clause 89, wherein the metallurgical bonding operation includes hot isostatic pressing of the steel-middle layer-vanadium intermediate tube.

92. The steel-middle layer-vanadium cladding manufacturing method of clause 89, wherein the metallurgical bonding operation is performed after the pilgering or extruding operation.

93. The steel-middle layer-vanadium cladding manufacturing method of clause 89, wherein the metallurgical bonding operation is performed before the pilgering or extruding operation.

94. The steel-middle layer-vanadium cladding manufacturing method of clause 89, wherein the depositing operation includes depositing the nickel, nickel alloy, chromium, chromium alloy, zirconium or zirconium alloy by organometallic chemical vapor deposition (OMCVD); thermal evaporation, sputtering, pulsed laser deposition (PLD), cathodic arc, or electrospark deposition (ESD).

95. The steel-middle layer-vanadium cladding manufacturing method of clause 90, wherein the inner layer has a thickness that is from 0.1% to 50% of the thickness of the steel layer and the middle layer has a thickness that is from 0.1% to 50% of the thickness of the first layer.

96. The steel-middle layer-vanadium cladding manufacturing method of clause 90, wherein the inner layer has a thickness that is from 1% to 5% of the thickness of the steel layer and the middle layer has a thickness that is from 1% to 5% of the thickness of the first layer.

97. The steel-middle layer-vanadium cladding manufacturing method of clauses 90-96, wherein the inner layer is selected from the vanadium alloys V-20Ti, V-10Cr-5Ti, V-15Cr-5Ti, V-4Cr-4Ti, V-4Cr-4Ti NIFS Heats 1 & 2, V-4Cr-4Ti US Heats 832665 & 8923864, and V-4Cr-4Ti Heat CEA-J57.

98. The steel-middle layer-vanadium cladding manufacturing method of clause 90, wherein the inner layer consists of:

3.0-5.0 wt. % Cr;

3.0-5.0 wt. % Ti; and no more than 0.02 wt. % C;

with the balance being V and other elements, wherein the vanadium alloy includes not greater than 0.1 wt. % of each of these other elements, and wherein the total of these other elements does not exceed 0.5 wt. %.

99. The steel-middle layer-vanadium cladding manufacturing method of clause 97, wherein the inner layer consists of:

3.5-4.5 wt. % Cr;

3.5-4.5 wt. % Ti;

0.04-0.1 wt. % Si;

up to 0.02 wt. % 0;

up to 0.02 wt. % N;

up to 0.02 wt. % C;

up to 0.02 wt. % Al;

up to 0.02 wt. % Fe;

up to 0.001 wt. % Cu;

up to 0.001 wt. % Mo;

up to 0.001 wt. % Nb;

up to 0.001 wt. % P;

up to 0.001 wt. % S; and no more than 0.0002 wt. % Cl;

with the balance being V and other elements, wherein the vanadium alloy includes not greater than 0.001 wt. % of each of these other elements, and wherein the total of these other elements does not exceed 0.01 wt. %.

100. The steel-middle layer-vanadium cladding manufacturing method of any of clauses 90-96, wherein the inner layer consists of:

0.001-0.5 wt. % C;

the balance being V and other elements, wherein the second layer includes not greater than 0.1 wt. % of each of these other elements, and wherein the total of these other elements does not exceed 0.5 wt. %.

101. The steel-middle layer-vanadium cladding manufacturing method of clause 96, wherein the inner layer includes from 0.1 to 0.3 wt. % C in addition to V.

102. The steel-middle layer-vanadium cladding manufacturing method of any of clauses 89-101, wherein the steel of the steel layer is selected from a tempered martensitic steel, a ferritic steel, an austenitic steel, an oxide-dispersion strengthened steel, T91 steel, T92 steel, HT9 steel, 316 steel, and 304 steel.

103. The steel-middle layer-vanadium cladding manufacturing method of any of clauses 89-101, wherein the steel of the first layer consists of:

9.0-12.0 wt. % Cr;
0.001-2.5 wt. % W;
0.001-2.0 wt. % Mo;
0.001-0.5 wt. % Si;
up to 0.5 wt. % Ti;
up to 0.5 wt. % Zr;
up to 0.5 wt. % V;
up to 0.5 wt. % Nb;
up to 0.3 wt. % Ta;
up to 0.1 wt. % N;
up to 0.3 wt. % C;
up to 0.01 wt. % B;
the balance being Fe and other elements, wherein the steel includes not greater than 0.15 wt. % of each of these other elements, and wherein the total of these other elements does not exceed 0.35 wt. %.

104. The steel-middle layer-vanadium cladding manufacturing method of any of clauses 89-99, wherein the steel includes one or more of carbide precipitates of Ti, Zr, V, Nb, Ta or B, nitride precipitates of Ti, Zr, V, Nb, or Ta, and/or carbo-nitride precipitates of Ti, Zr, V, Nb, or Ta.

105. The steel-middle layer-vanadium cladding manufacturing method of any of clauses 97-99, wherein the vanadium alloy includes one or more carbide precipitates of Cr, Ti and/or other elements.

106. The steel-middle layer-vanadium cladding manufacturing method of any of clauses 89-94 and 97-105, wherein the steel layer is at least 99% of the total thickness of the steel-middle layer-vanadium cladding and wherein with each of the middle layer and inner layer being from 0.0001% to 0.5% of the thickness of the steel layer.

Notwithstanding that the numerical ranges and parameters setting forth the broad scope of the technology are approximations, the numerical values set forth in the specific examples are reported as precisely as possible. Any numerical values, however, inherently contain certain errors necessarily resulting from the standard deviation found in their respective testing measurements.

It will be clear that the systems and methods described herein are well adapted to attain the ends and advantages mentioned as well as those inherent therein. Those skilled in the art will recognize that the methods and systems within this specification may be implemented in many manners and as such are not to be limited by the foregoing exemplified embodiments and examples. In this regard, any number of the features of the different embodiments described herein may be combined into one single embodiment and alternate embodiments having fewer than or more than all of the features herein described are possible.

While various embodiments have been described for purposes of this disclosure, various changes and modifications may be made which are well within the scope contemplated by the present disclosure. Numerous other changes may be made which will readily suggest themselves to those skilled in the art and which are encompassed in the spirit of the disclosure.

The invention claimed is:

1. A steel-middle layer-vanadium cladding comprising:
an outer layer of steel;
a middle layer of nickel, nickel alloy, chromium, chromium alloy, zirconium or zirconium alloy between the outer layer and the inner layer; and
an inner layer consisting of:
0.1-0.3 wt. % C;
the balance being V and other elements, wherein the inner layer includes not greater than 0.1 wt. % of each of these other elements, and wherein the total of these other elements does not exceed 0.5 wt. %.

2. The steel-middle layer-vanadium cladding of claim 1, wherein the outer layer and the middle layer are metallurgically bonded together.

3. The steel-middle layer-vanadium cladding of claim 1, wherein the steel of the first layer is selected from a tempered martensitic steel, a ferritic steel, an austenitic steel, an oxide-dispersion strengthened steel, T91 steel, T92 steel, HT9 steel, 316 steel, and 304 steel.

4. The steel-middle layer-vanadium cladding of claim 1, wherein the inner layer has a thickness that is from 0.1% to 50% of the thickness of the steel layer and the middle layer has a thickness that is from 0.1% to 50% of the thickness of the steel layer.

5. The steel-middle layer-vanadium cladding of claim 1, wherein the inner layer has a thickness that is from 0.1% to 50% of the thickness of the steel layer.

6. The steel-middle layer-vanadium cladding of claim 1, wherein the middle layer has a thickness that is from 0.1% to 50% of the thickness of the steel layer.

7. The steel-middle layer-vanadium cladding of claim 1, wherein the inner layer has a thickness that is from 1% to 5% of the thickness of the steel layer.

8. The steel-middle layer-vanadium cladding of claim 1, wherein the middle layer has a thickness that is from 1% to 5% of the thickness of the steel layer.

9. The steel-middle layer-vanadium cladding of claim 1, wherein the inner layer has a thickness that is from 1% to 5% of the thickness of the steel layer and the middle layer has a thickness that is from 1% to 5% of the thickness of the steel layer.

10. The steel-middle layer-vanadium cladding of claim 1, wherein the steel of the steel layer consists of:
9.0-12.0 wt. % Cr;
0.001-2.5 wt. % W;
0.001-2.0 wt. % Mo;
0.001-0.5 wt. % Si;
up to 0.5 wt. % Ti;
up to 0.5 wt. % Zr;
up to 0.5 wt. % V;
up to 0.5 wt. % Nb;
up to 0.3 wt. % Ta;
up to 0.1 wt. % N;
up to 0.3 wt. % C;
up to 0.01 wt. % B;
the balance being Fe and other elements, wherein the steel includes not greater than 0.15 wt. % of each of these other elements, and wherein the total of these other elements does not exceed 0.35 wt. %.

11. The steel-middle layer-vanadium cladding of claim 1, wherein the steel includes one or more of carbide precipitates of Ti, Zr, V, Nb, Ta or B, nitride precipitates of Ti, Zr, V, Nb, or Ta, and/or carbo-nitride precipitates of Ti, Zr, V, Nb, or Ta.

12. The steel-middle layer-vanadium cladding of claim 1, wherein the inner layer includes one or more carbide precipitates of Cr, Ti and/or other elements.

13. The steel-middle layer-vanadium cladding of claim 1, wherein the steel layer is at least 99% of the total thickness of the steel-middle layer-vanadium cladding and wherein with each of the middle layer and inner layer being from 0.0001% to 0.5% of the thickness of the steel layer.

14. The steel-middle layer-vanadium cladding of claim 1, wherein the steel-middle layer-vanadium cladding is in the form of a tube with an interior surface and an exterior surface, the inner layer forming the interior surface of the tube and the outer layer forming the exterior surface of the tube.

15. The steel-middle layer-vanadium cladding of claim 14 further comprising:
an amount of nuclear material within the tube.

16. The steel-middle layer-vanadium cladding of claim 15, wherein the nuclear material includes one or more elements selected from U, Th, Am, Np, and Pu.

17. The steel-middle layer-vanadium cladding of claim 15, wherein the nuclear material includes at least one refractory material chosen from Nb, Mo, Ta, W, Re, Zr, V, Ti, Cr, Ru, Rh, Os, Ir, Nd, and Hf.

* * * * *